US010387506B2

(12) United States Patent
Mishra et al.

(10) Patent No.: US 10,387,506 B2
(45) Date of Patent: Aug. 20, 2019

(54) SYSTEMS AND METHODS FOR ONLINE MATCHMAKING

(71) Applicant: EHARMONY, INC., Santa Monica, CA (US)

(72) Inventors: Arvind Mishra, Encino, CA (US); Christine Hoo Elfalan, Hermosa Beach, CA (US); Evelina Rodriguez, Los Angeles, CA (US)

(73) Assignee: EHARMONY, INC., Los Angeles, CA (US)

( * ) Notice: Subject to any disclaimer, the term of this patent is extended or adjusted under 35 U.S.C. 154(b) by 682 days.

(21) Appl. No.: 14/213,092

(22) Filed: Mar. 14, 2014

(65) Prior Publication Data

US 2015/0026173 A1    Jan. 22, 2015

Related U.S. Application Data

(60) Provisional application No. 61/784,749, filed on Mar. 14, 2013.

(51) Int. Cl.
*G06F 16/9535* (2019.01)
*G06Q 30/02* (2012.01)

(52) U.S. Cl.
CPC ......... *G06F 16/9535* (2019.01); *G06Q 30/02* (2013.01)

(58) Field of Classification Search
CPC ..... G06Q 50/01; G06Q 30/02; G06F 16/9535
USPC .......................................................... 705/319
See application file for complete search history.

(56) References Cited

U.S. PATENT DOCUMENTS

| 6,272,467 B1 * | 8/2001 | Durand ................. G06Q 10/02 705/26.1 |
| 7,454,357 B2 | 11/2008 | Buckwalter et al. |
| 2002/0116458 A1 * | 8/2002 | Bricklin ................. G06Q 30/02 709/204 |

(Continued)

OTHER PUBLICATIONS

Houran James, Lange Rense, Rentfrow P Jason, Bruckner Karin H, Do Online Matchmaking Tests Work? An Assessment of Preliminary Evidence for a Publicized Predictive Model of Marital Success, 2004, North American Journal of Psychology (Year: 2004).*

(Continued)

*Primary Examiner* — Eric T Wong
*Assistant Examiner* — Kevin T Poe
(74) *Attorney, Agent, or Firm* — One LLP

(57) ABSTRACT

The field of the invention relates to systems and methods for operation of a matching service, and more specifically to operation of a matching service utilizing electronic data related to participants' experiences, e.g., locations visited and activities completed. In an embodiment, the system includes a matching server system, operatively coupled to a network, configured to calculate a compatibility value generated from correlating a first user match profile with a second user match profile, such correlation resulting in a potential match if the compatibility value exceeds a predetermined threshold, and at least one user device, operatively coupled to the network, wherein the user device is configured to enable users to post and respond to user experiences. When a second user responds to the posting of the first user, the compatibility value correlating the first user match profile with the second user match profile is increased. The user experiences include at least one of places and activities.

10 Claims, 30 Drawing Sheets

(56) References Cited

U.S. PATENT DOCUMENTS

| | | | | |
|---|---|---|---|---|
| 2004/0249811 A1* | 12/2004 | Shostack | ................ | G06Q 30/02 |
| 2004/0260781 A1* | 12/2004 | Shostack | ................ | G06Q 30/02 |
| | | | | 709/207 |
| 2006/0167944 A1* | 7/2006 | Baker | ................... | G06Q 30/02 |
| 2008/0086319 A1* | 4/2008 | Berger | .................. | G06Q 50/01 |
| | | | | 705/319 |
| 2008/0270038 A1* | 10/2008 | Partovi | ................. | G06Q 10/00 |
| | | | | 702/19 |
| 2009/0094048 A1* | 4/2009 | Wallace | ................ | G06Q 50/01 |
| | | | | 705/319 |
| 2009/0177796 A1* | 7/2009 | Falk | ............................. | 709/238 |
| 2010/0257028 A1* | 10/2010 | Hillerbrand | .......... | G06Q 10/067 |
| | | | | 705/319 |
| 2010/0266167 A1* | 10/2010 | Kodesh | ............. | G06K 9/00288 |
| | | | | 382/118 |
| 2013/0166643 A1 | 6/2013 | Essas | | |
| 2014/0172893 A1* | 6/2014 | Carter | .............. | G06F 17/30861 |
| | | | | 707/758 |

OTHER PUBLICATIONS

Carter Steven R, Buckwalter J Galen, Enhancing Mate Selection through the Internet: A Comparison of Relationship Quality between Marriages arising from an Online Matchmaking System and Marriages arising from Unfettered Selection, 2009, International Journal on Personal Relationships (Year: 2009).*

Joshi Kedar, Kumar Sushil, Matchmaking using Fuzzy Analytical Hierarchy Process, Compatibility Measure and Stable Matching for Online Matrimony in India, 2012, Journal of Multi Criteria Decision Analysis, (Year: 2012).*

* cited by examiner

Figure 4

Profile

Figure 14B

SYSTEMS AND METHODS FOR ONLINE MATCHMAKING

CROSS-REFERENCE TO RELATED APPLICATIONS

The present application claims priority to U.S. Provisional Application No. 61/784,749 filed Mar. 14, 2013, which is hereby incorporated by reference in its entirety.

FIELD OF THE INVENTION

The field of the invention relates to systems and methods for the operation of a matching service, and more specifically to operation of a matching service utilizing electronic data related to participants' experiences, e.g., locations visited and activities completed.

BACKGROUND OF THE INVENTION

Research has shown that the success of human interpersonal relationships depends on complex interactions between a large number of variables, including but not limited to, personality, socioeconomic status, religion, appearance, ethnic background, energy level, education and interests. Matching services have developed effective systems that analyze these variables to identify and match people who have the potential to establish a successful relationship. A well-known example of such a service is eHarmony, Inc. (which can be found at www.eHarmony.com). A matching service generally collects and stores data to create a "profile" for each user that includes a number of factors potentially relevant to establishing a successful interpersonal relationship with that user. The matching service then correlates that user's profile with others in its database to assess which profiles are compatible, i.e. which users have the potential for a successful relationship when matched. Generally, potentially compatible users are identified and given the opportunity to interact with each other so as to establish the suggested relationship.

The variables used by these matching services are generally based on empirical data gathered from the user's themselves, e.g. by the user's written responses to an initial survey. In addition to this empirical data, additional data based on a user's previous experiences, such as locations visited and activities completed, may be helpful in these services.

Accordingly, matching systems and methods that utilize users' previous experiences is desirable.

SUMMARY OF THE INVENTION

The field of the invention relates to systems and methods for the operation of a matching service, and more specifically to operation of a matching service utilizing electronic data related to participants' experiences, e.g., locations visited and activities completed.

In an embodiment, the system includes a matching server system, operatively coupled to a network, configured to calculate a compatibility value generated from correlating a first user match profile with a second user match profile, such correlation resulting in a potential match if the compatibility value exceeds a predetermined threshold, and at least one user device, operatively coupled to the network, wherein the user device is configured to enable users to post and respond to user experiences. When a second user responds to the posting of the first user, the compatibility value correlating the first user match profile with the second user match profile is increased. The user experiences include at least one of places and activities. In another embodiment, the system further imports data from one or more social networking systems.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 4 is another exemplary user profile according to an embodiment of the present invention.

FIGS. 14A and 14B are other exemplary user interfaces according to an embodiment of the present invention.

DETAILED DESCRIPTION OF THE PREFERRED EMBODIMENTS

The above described drawing figures illustrate the invention in at least one preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Figure 1:
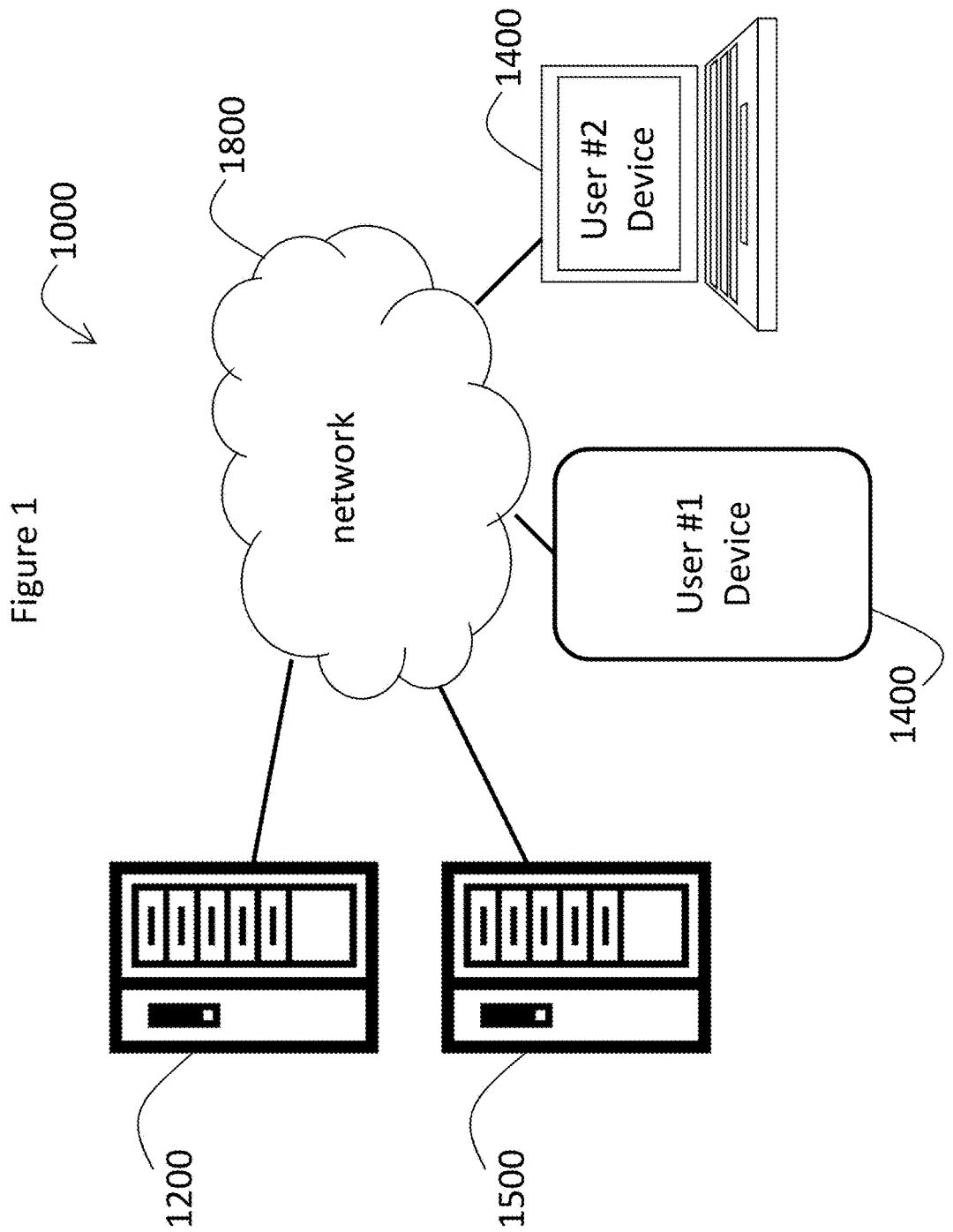
FIG. 1 is an exemplary diagram of an online interpersonal match system according to an embodiment of the present invention.

FIG. 1 shows a computer-based compatibility matching system 1000 according to an embodiment of the present invention. The system 1000 generally includes a matching server system 1200, which may be distributed on one or more physical servers, each having one or more processors, memory, an operating system, and input/output interfaces, and a network interface all known in the art, a third-party system 1500 (e.g., Facebook, and so on), and a plurality of end user devices 1400 coupled to a network 1800, such as the Internet and/or a cellular-based wireless network, a private network, or a combination thereof. The user devices 1400 include, for example, mobile device, desktop, smart TV, and so on. A mobile device may be a mobile phone, a tablet, a laptop, a wearable device, or any portable device having a network interface known in the art. A user device 1400 may be any combination of devices. A user device 1400 may run one or more applications, such as Internet browsers, voice calls, video games, videoconferencing, and email, among others.

Figure 2:
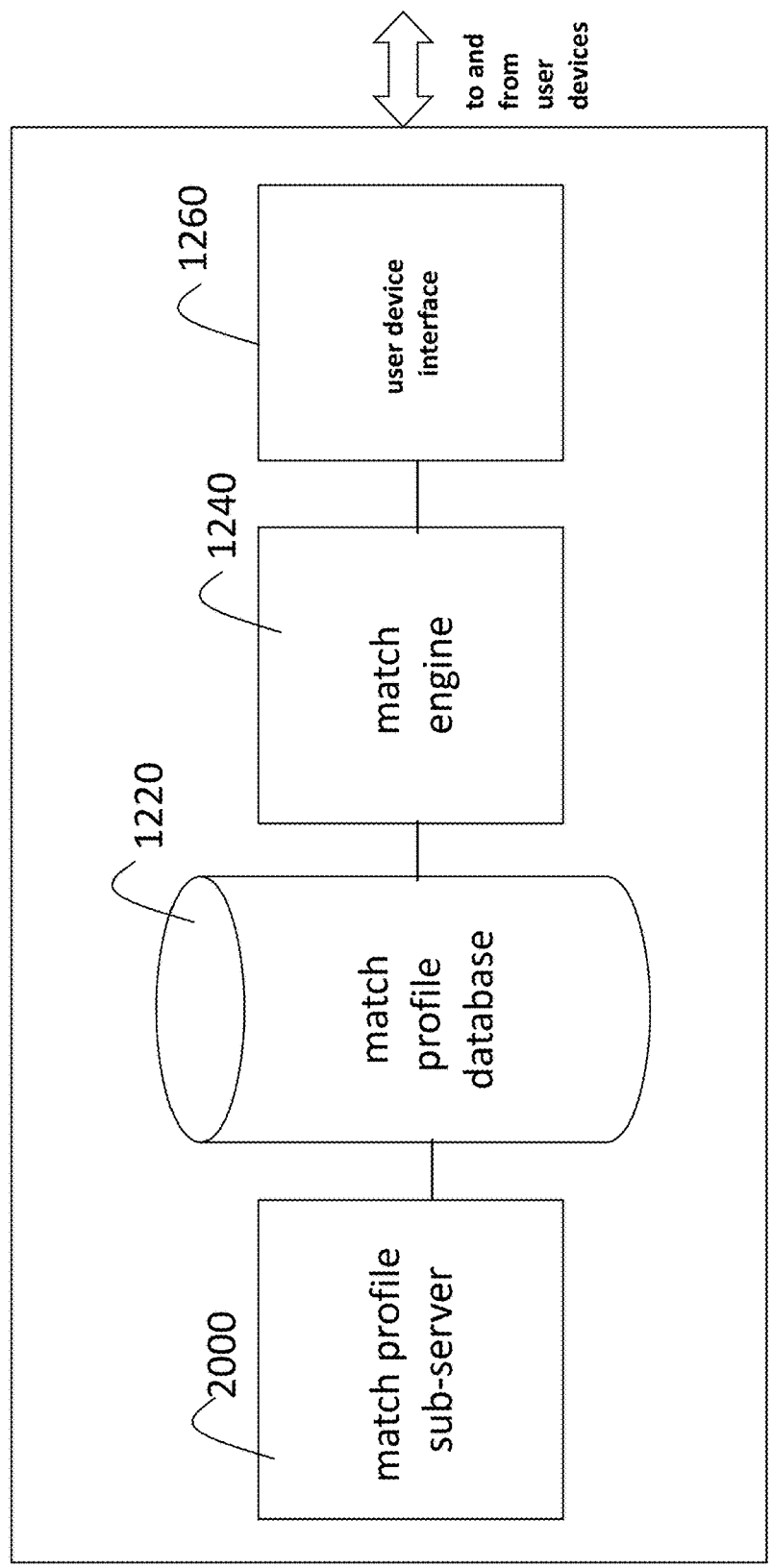
FIG. 2 is an exemplary diagram of a matching system server according to an embodiment of the present invention.

An exemplary embodiment of the matching server system is shown in FIG. 2. The matching server system generally includes a computer application designed to match end users who have the potential to establish a successful interpersonal relationship. To obtain potential matches, each user establishes a "match profile" that includes data and factors potentially relevant to establishing a successful interpersonal relationship with that user. These factors can be organized into three major categories (1) physical attraction; (2) interpersonal interests, traits and preferences that are self-identified, such as hobbies, geographical location, occupation, and sexual orientation, and so on; and (3) deep psychological traits and preferences, such as curiosity and interests that may not be self-identified. These factors are generated from empirical data collected from the user. An exemplary approach to establishing a match profile for a user is described in detail in U.S. Pat. No. 7,454,357, issued to J. Galen Buckwalter et. al. on Nov. 18, 2008, which is hereby incorporated by reference in its entirety ("the Buckwalter patent").

These match profiles are stored in a match profile database 1220 and organized by the user's match profile identification ("ID"). In the process of creating potential matches for a particular user, a match engine 1240 queries the user's match profile by its respective ID, and correlates that profile with other profiles to calculate a compatibility value. If two profiles generate a compatibility value that meets a pre-defined threshold, then there is potential for the two respective users to have a satisfactory and/or successful interpersonal relationship if matched. This calculation can also incorporate data based on a user's previous history of matches and satisfaction rate as well as the history of other users with comparable empirical data, thereby enabling a feedback system that allows the system to "learn" how to optimize the correlation calculation. This process can also involve developing and utilizing a "neural network" to resolve problems in complex data. Details of this calculation and correlation process and the neural network are also described in the Buckwalter patent, which describes an exemplary compatibility value in the form of a "satisfaction index."

Preferably, the match engine 1240 is configured to generate more than one compatibility value between two or more correlated match profiles, where each compatibility value is associated with a different type of relationship, e.g., dyadic, romantic, friendship, business, social, recreational, team oriented, long-term, or short term (e.g., minutes, hours, days, or months). Each type of relationship may involve the correlation of different factors and/or different weighting of factors from the various categories described above.

Figure 3:
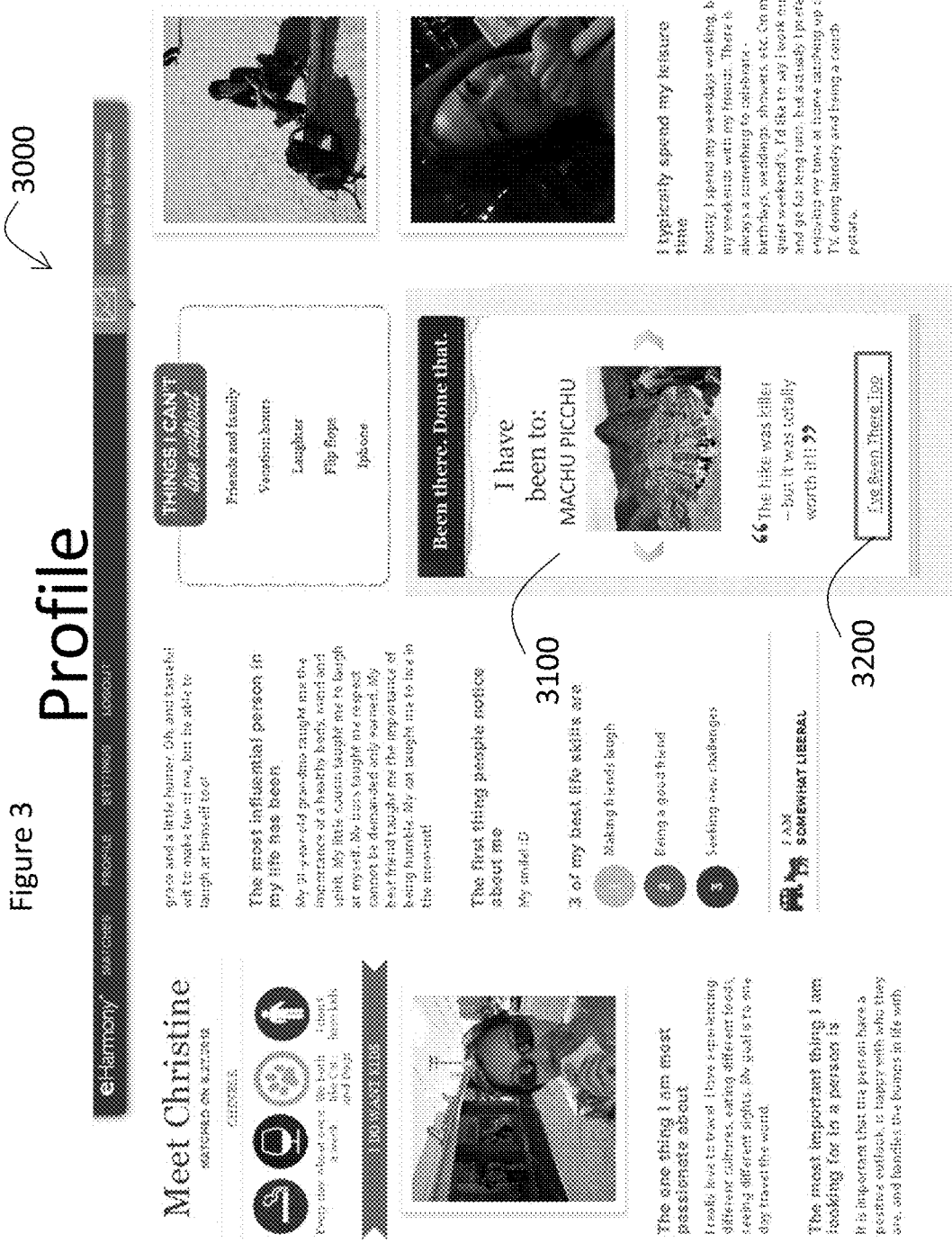
FIG. 3 is an exemplary user profile according to an embodiment of the present invention.
Figure 4:
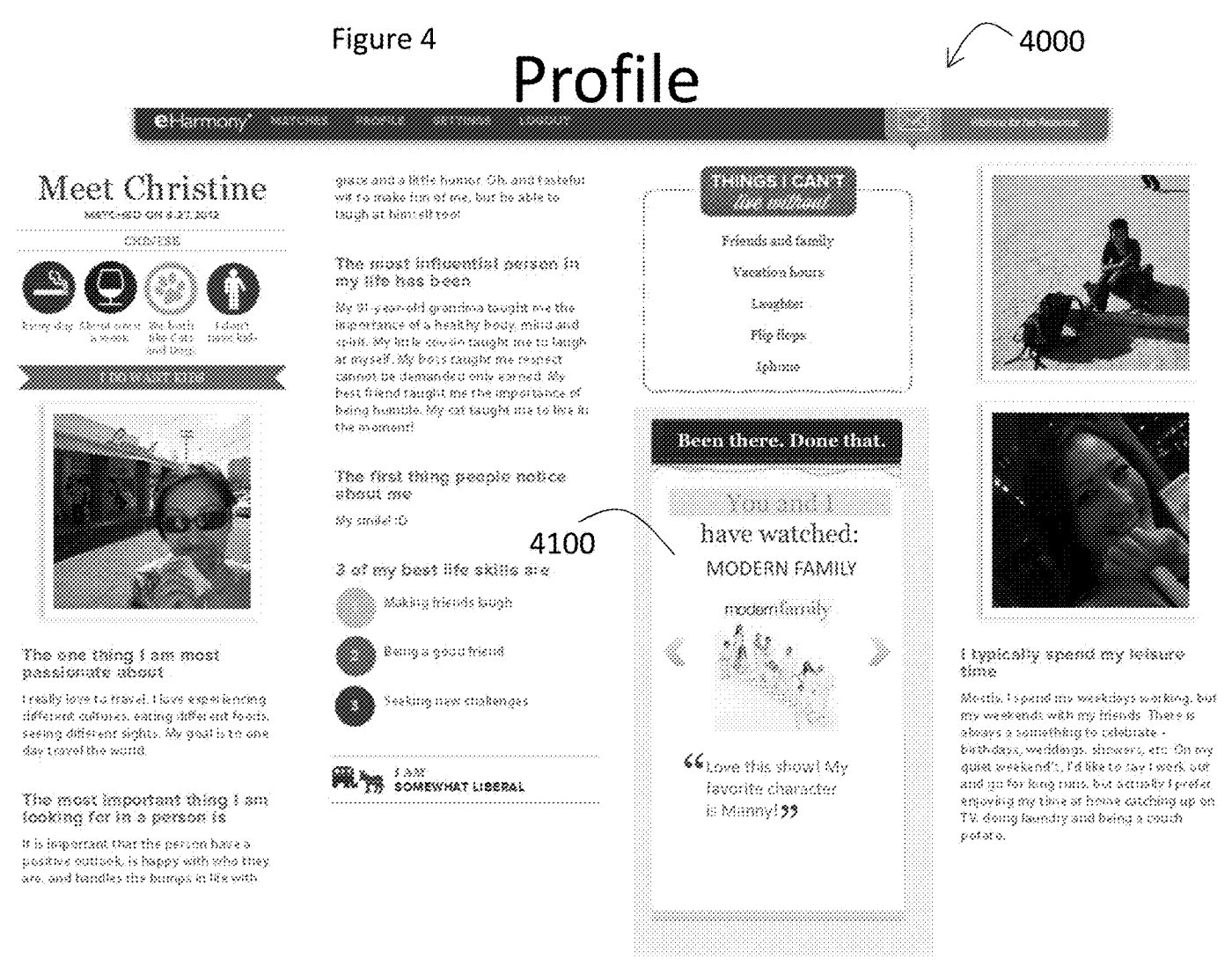

FIG. 3 shows an exemplary user profile 3000 of the system 1000. According to an embodiment, data for a user profile may further include electronic data related to the users' experiences, e.g., locations a user has visited, as shown in window 3100, or activities a user has completed ("Been There. Done That"). System 1000 further provides selection box 3200 to enable other users, who are viewing the user profile 3000, to identify matches to such data. For example, a second user may respond whether he or she has also been to the same locations (e.g., Machu Pichu as shown in FIG. 3) or has accomplished the same activities. As shown in FIG. 4, after the second user has identified that the user and the second user have accomplished the same activity (e.g., have watched the TV show Modern Family), the user profile 4000 reflects the same activity in window 4100. When the second user responds to the posted experience and/or activity of the user, the compatibility value between the user and the second user increases. The compatibility values between the second user and other users who also completed the same experience and activity may also increase. Other posts and data may include shared friends, hobbies, interests, movies, books, music, items owned in the past or currently owned by the user, and so on. The system 1000 recognizes that shared interests are important when it comes to relationships. Knowing that the users have the same sense of adventure or a common group of friends with others gives the users something to instantly talk about.

Figure 5:
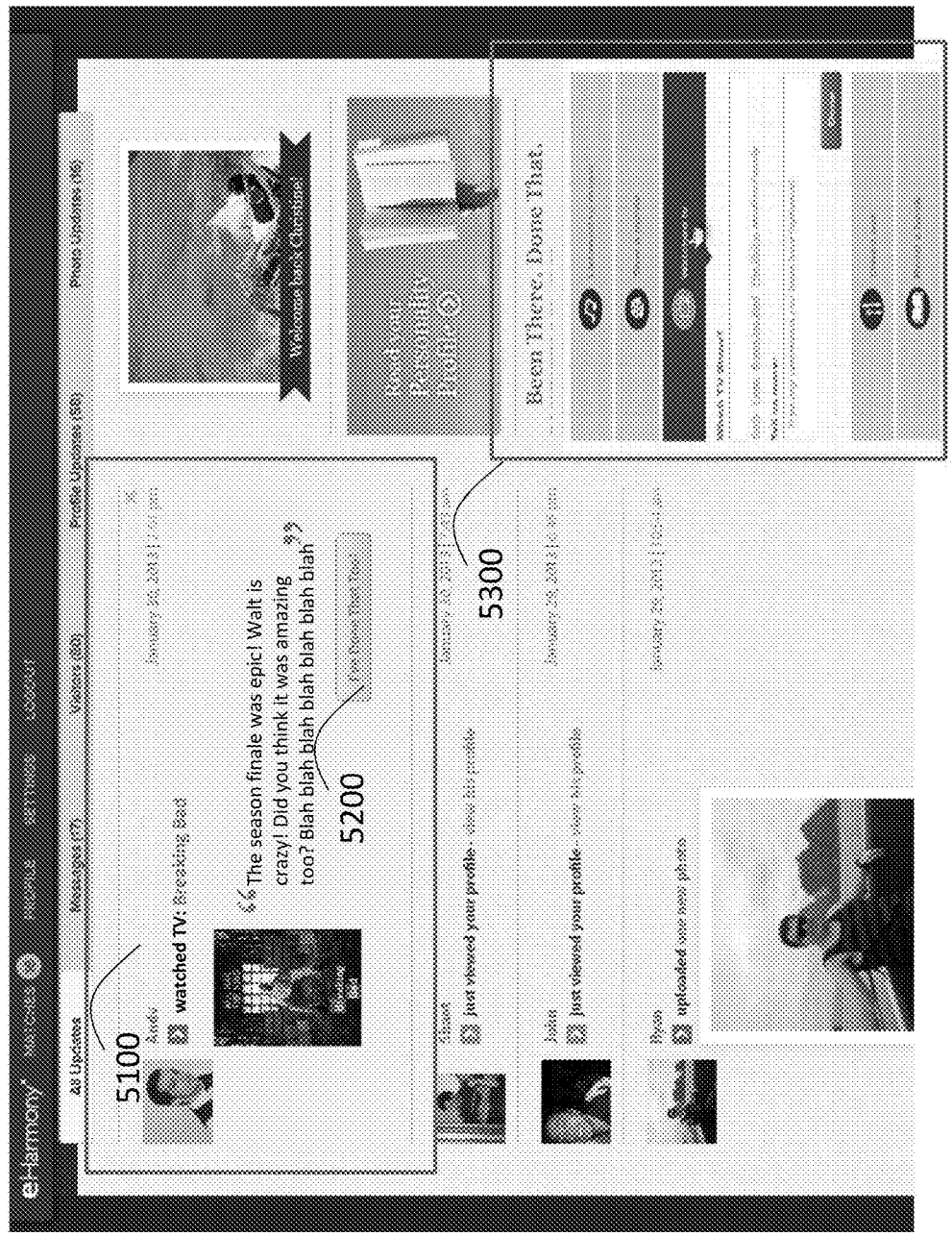
FIG. 5 is an exemplary user interface according to an embodiment of the present invention.
Figure 5A:
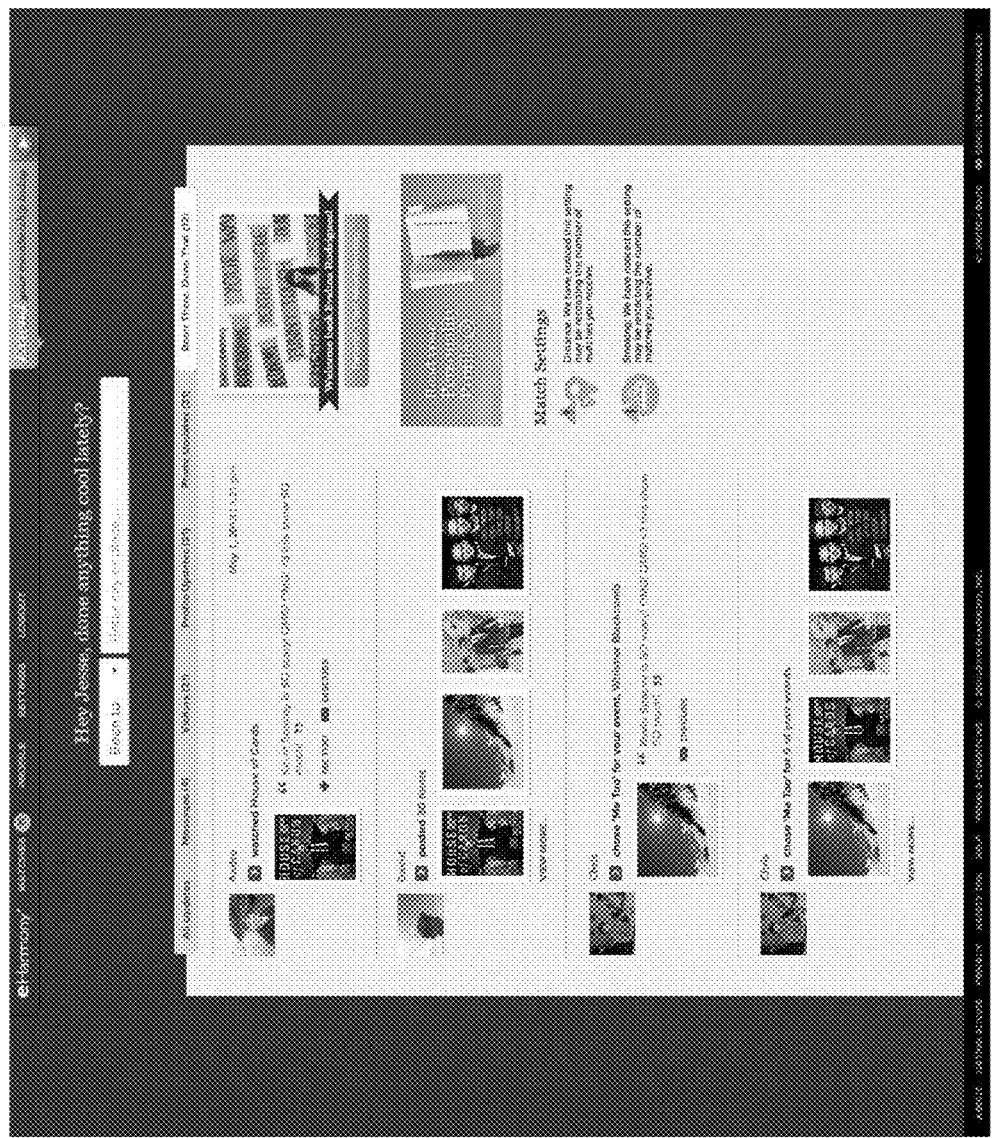
FIG. 5A is another exemplary user interface according to an embodiment of the present invention.

FIG. 5 shows another example for posting data related to user's experiences. FIG. 5 shows an exemplary dashboard 5000 where a user may view the experiences of other users. In this example, the system 1000 shows second user Andy 5100 has watched the TV show Breaking Bad. The user may then respond that the user has also done the same activity, e.g., by clicking on selection box 5200 I've Done That Too! (or "Me Too", FIG. 5A), or to communicate with poster ("Discuss", FIG. 5A). The window 5300 shows another interface where the user may post activities as shown in more detail in FIG. 6.

Figure 6:
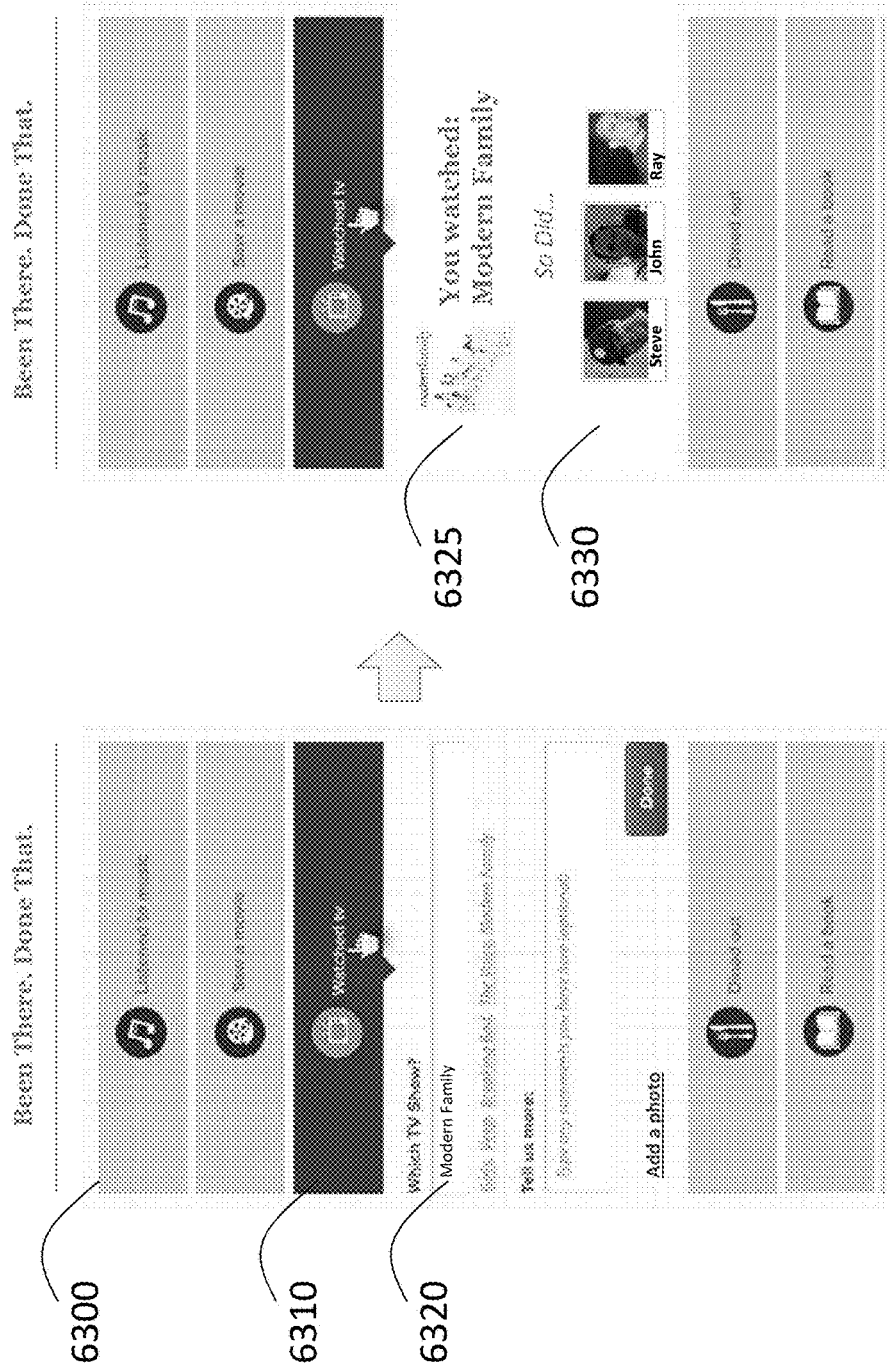
FIG. 6 is another exemplary user interface according to an embodiment of the present invention.

FIG. 6 shows an exemplary interface for a user to post (or submit) an activity. These activities (or experiences) are shown in window 5300 in FIG. 5 and is shown in more detail in 6300 in FIG. 6. Exemplary activities include, but are not limited to, Listened to music, Saw a movie, Watched TV, Dined out, Read a book, and so on. When the user selects an experience, e.g., Watched TV 6310, the matching system 1200 displays box 6320 for the user to provide further information, e.g., the TV show Modern Family that the user watched. As a result, the system 1200 stores, retrieves information about the TV show, and displays the results in 6325. The system 1200 further searches, retrieves and displays in 6330 other users (matches) who have also done the same activity, or have the same experiences. In this example, the system 1200 displays other users who have also watched the TV show Modern Family. These data (matches) may also be saved in the user profile.

In another embodiment, system 1000 further enables users of mobile devices 1400, such as smartphones, tablets, and so on, to share their user experience data with other users directly though their respective mobile devices 1400 in ad hoc fashion. For example, users may exchange such data using "bump" technology known in the art. More information about said technology is further described in commonly owned U.S. patent application Ser. No. 13/335,773 to Joseph Essas, filed Dec. 22, 2011, entitled "Systems and Methods for Online Ad Hoc Matching," which is hereby incorporated by reference in its entirety.

In an embodiment, the system 1000 identifies what the user posts as "events." As shown above, event types may include places that the user has been to (country, state, city, local venues, and so on), or activities that the user has done or completed, for example, watched a movie, watched a TV show, read some books, listened to a song or band, other activities such as climbing, swimming, white-water rafting, and so on. An "event card" includes the details of each post. In an embodiment, the system 1000 enables the curation of events. The curation may be done at a predetermined time. The system 1000 may provide a list of curated or suggested activities. When a user posts an activity, the system 1000 may ask for a location, which may be optional. The system 1000 identifies how a second user interacts with a posted event as a "response" to the event.

Figure 7:
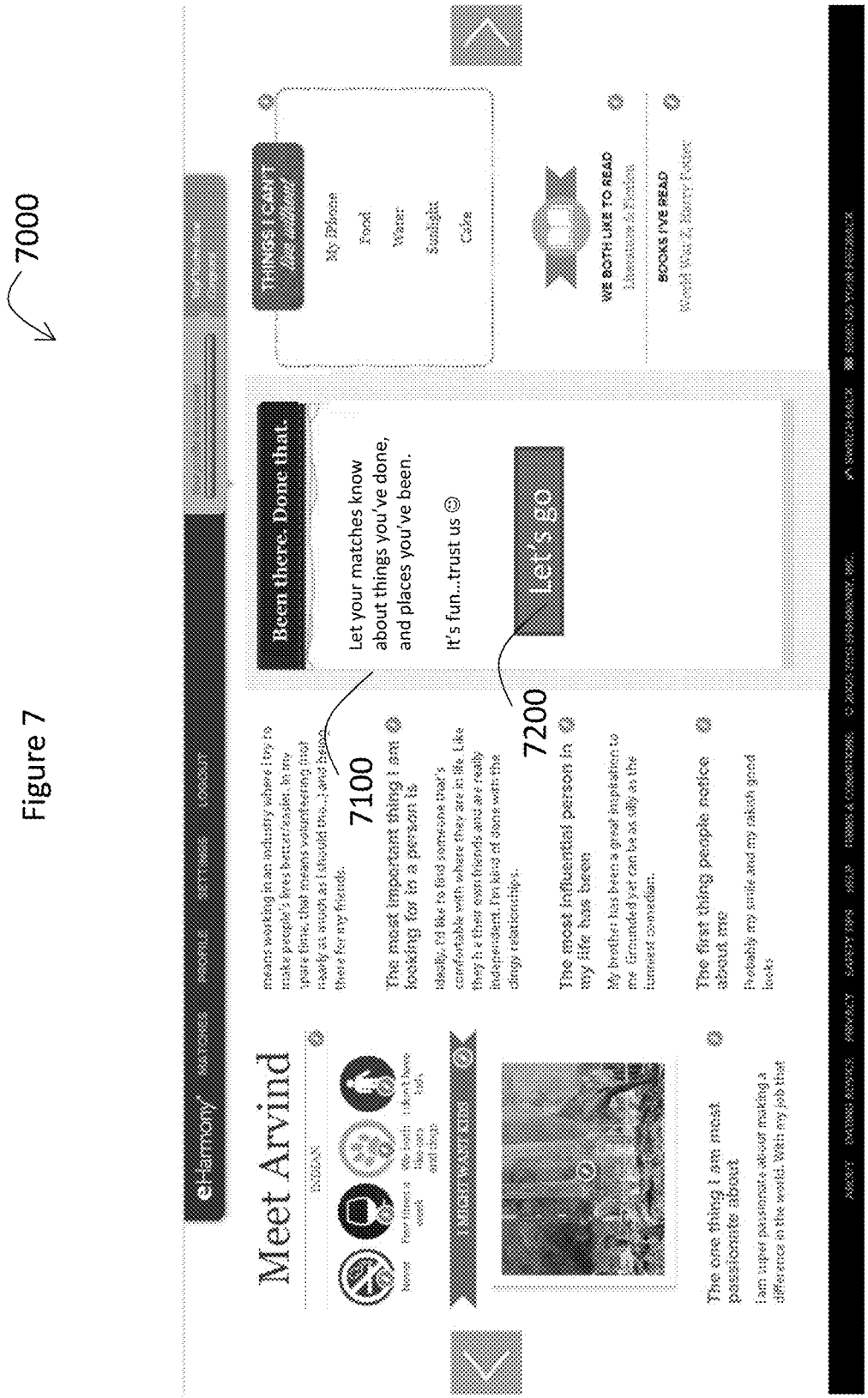
FIG. 7 is another exemplary user interface according to an embodiment of the present invention.

FIG. 7 shows an exemplary user profile 7000. User profile 7000 includes window 7100, similar to window 3100 in FIG. 3 and window 4100 in FIG. 4. The system 1200 encourages the user to post and/or import user experiences by clicking on button 7200 Let's go.

Figure 7A:
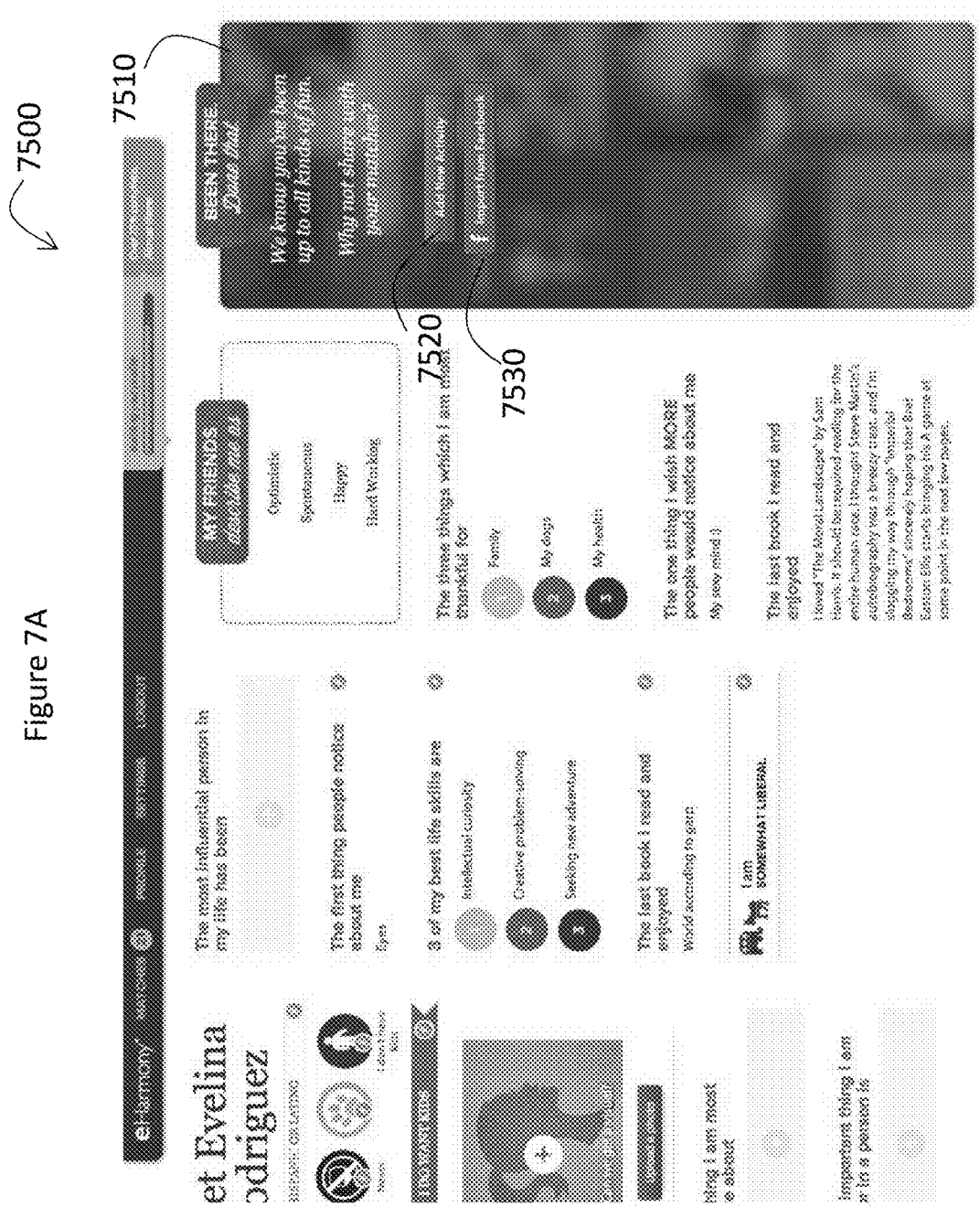
FIGS. 7A to 7H are other exemplary user interfaces according to an embodiment of the present invention.
Figure 7B:
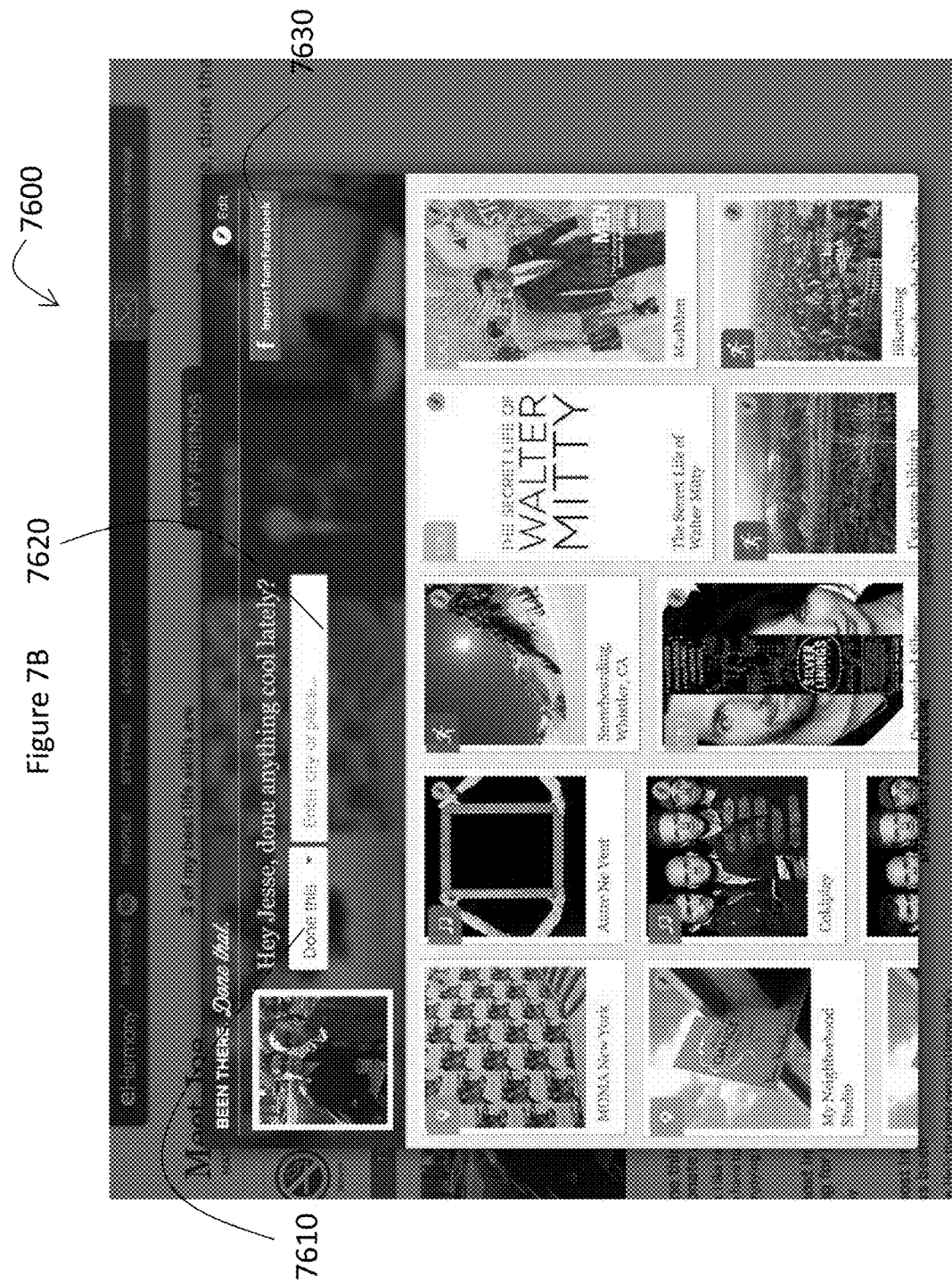

FIGS. 7A to 7F show other exemplary interfaces of the system 1000. FIG. 7A shows another exemplary user profile 7500. User profile 7500 includes window 7510 which is similar to window 7100 in FIG. 7. The user may click on box 7520 Add New Activity to add a new activity, or click on box 7530 Import from Facebook to import data from Facebook (described in more detail below). In the exemplary interface 7600 shown in FIG. 7B, the system 1000 provides an interface for adding an activity. A pull-down list 7610 of activities (e.g., Done this, Watched, Been to, etc.) is provided for the user to select. After selecting an activity, e.g., Been to (not shown), the user may enter a location for that activity in the location box 7620. Or the user may select box 7630 Import from Facebook to import data from Facebook. The interface 7600 also displays the past activities and experiences of the user. Each activity or experience has a marking to indicate the type of event. For example, a music note may indicate music that the user listened to, an eyeglass may indicate movie or show that the user watched, and so on.

Figure 7C:
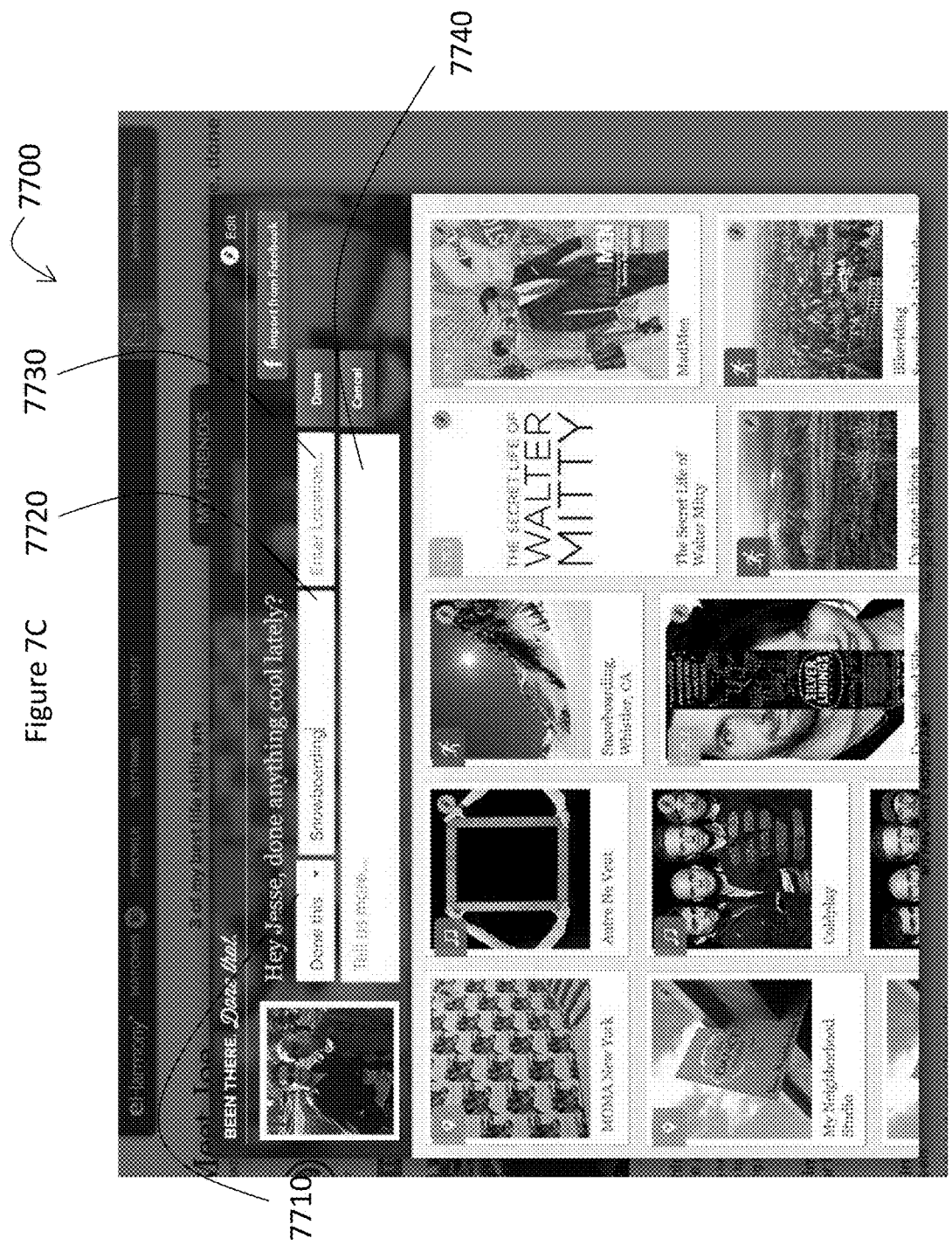
Figure 7D:
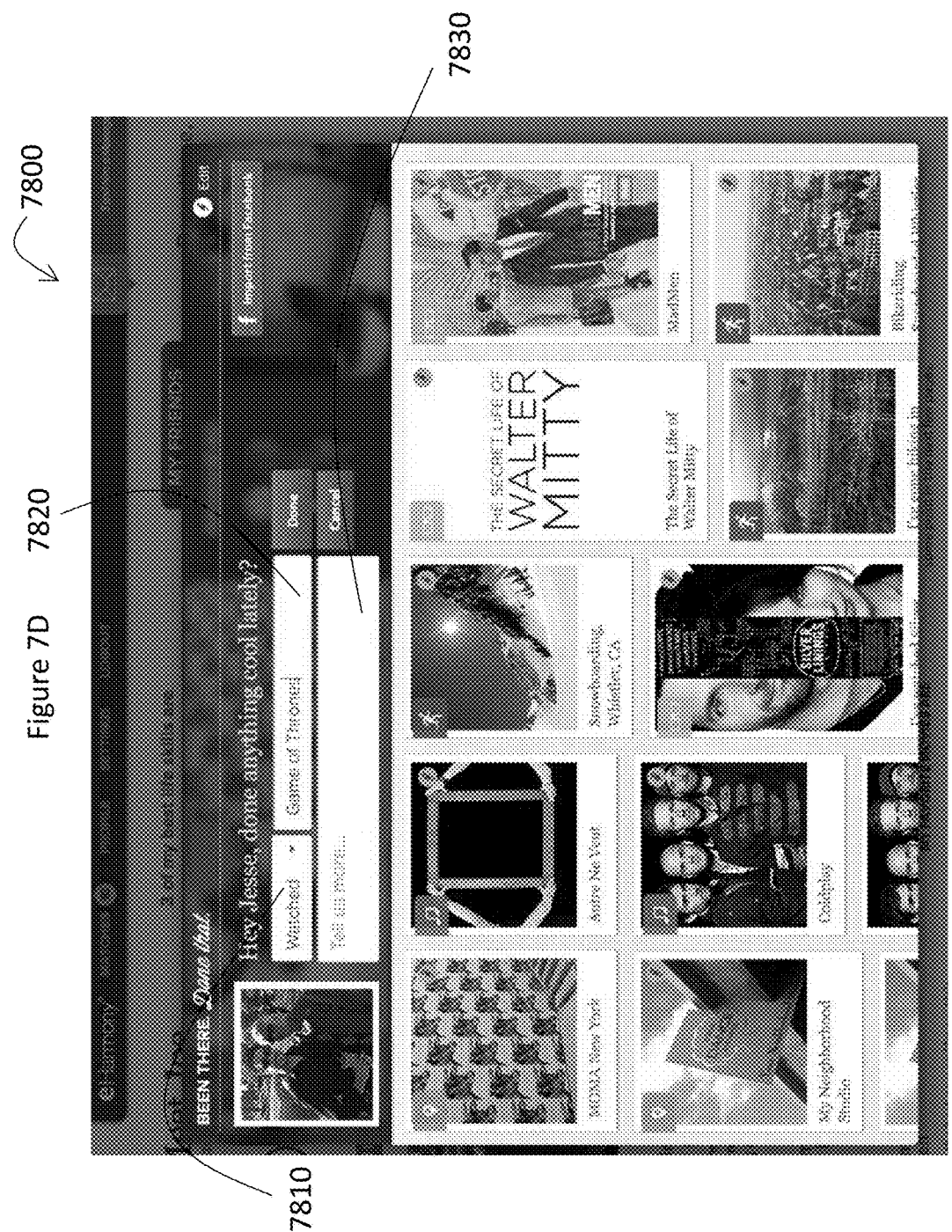

FIG. 7C shows an exemplary interface 7700 for adding a "Done this" activity (event). The user may enter the activity (event) type (e.g., Snowboarding) in the activity (event) type box 7720, and a location for that activity in the location box 7730. The user may also enter further details for the activity in the activity detail box 7740. FIG. 7D shows an exemplary interface 7800 for adding a "Watched" activity. In this interface, the user may enter a movie, TV show (e.g., Games of Throne), and so on, in activity type box 7820. The user may also enter further details for the activity in the activity detail box 7830. An added activity will be displayed in the list of past activities/events, which are also past experiences.

Figure 7E:
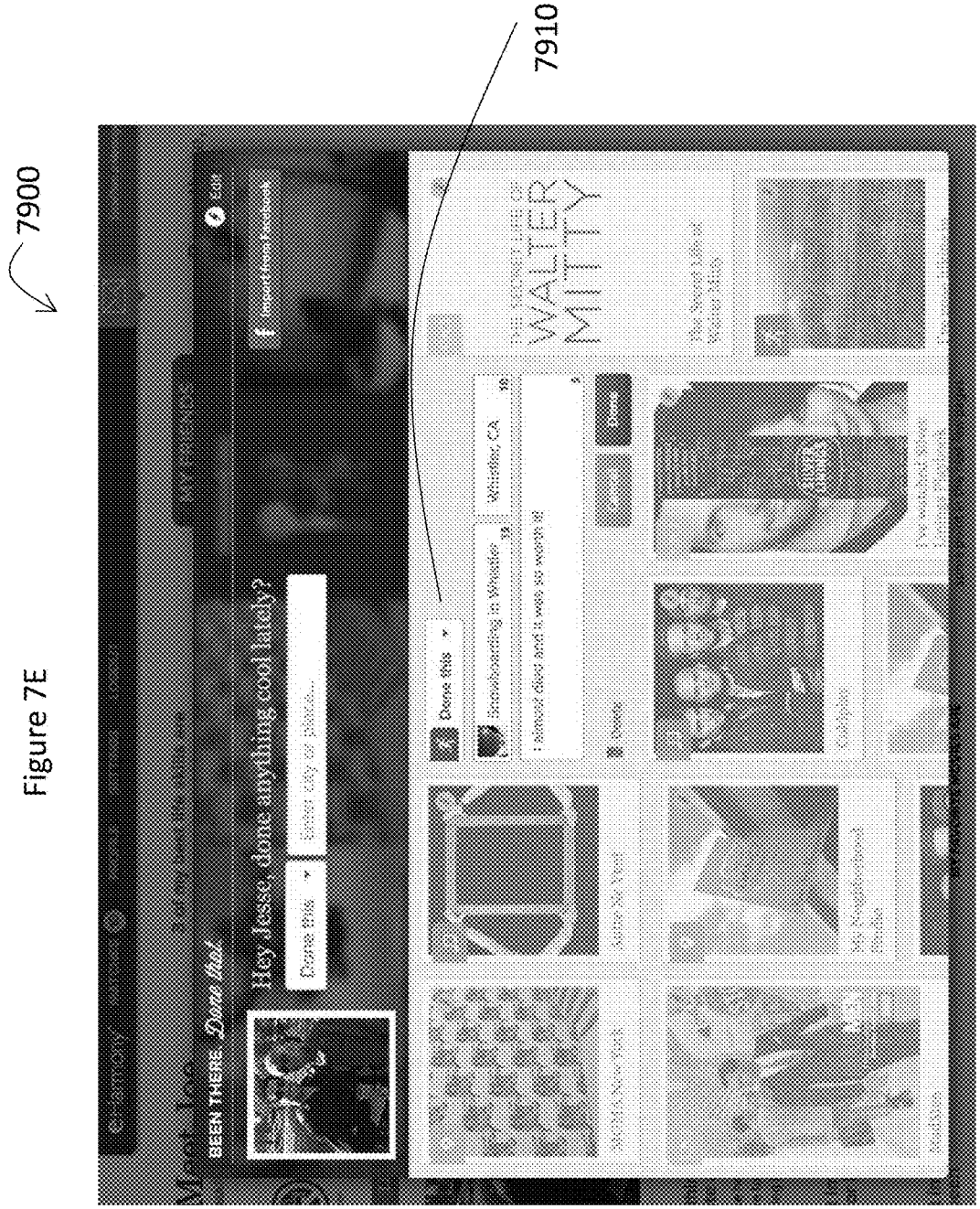
Figure 7F:
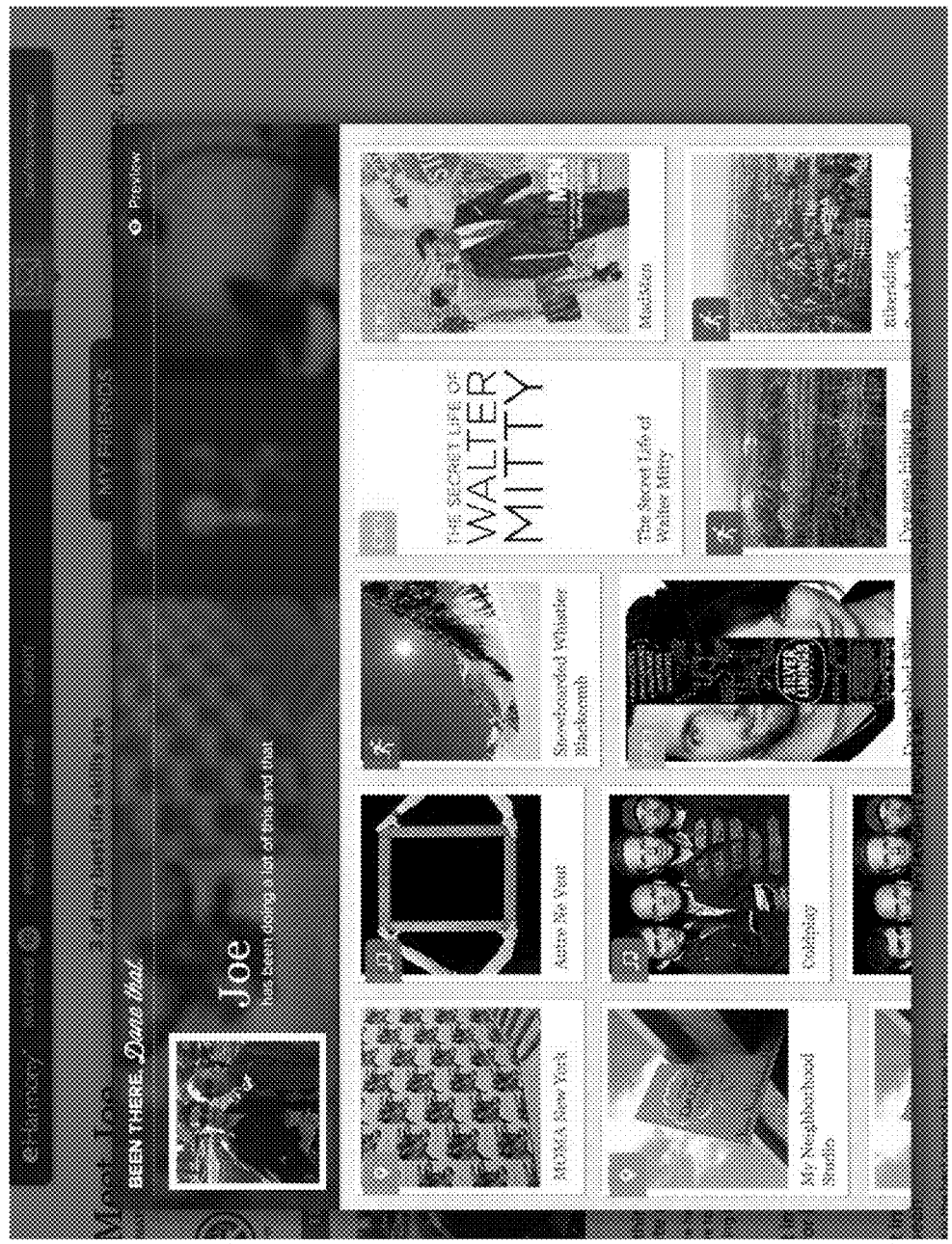
Figure 7G:
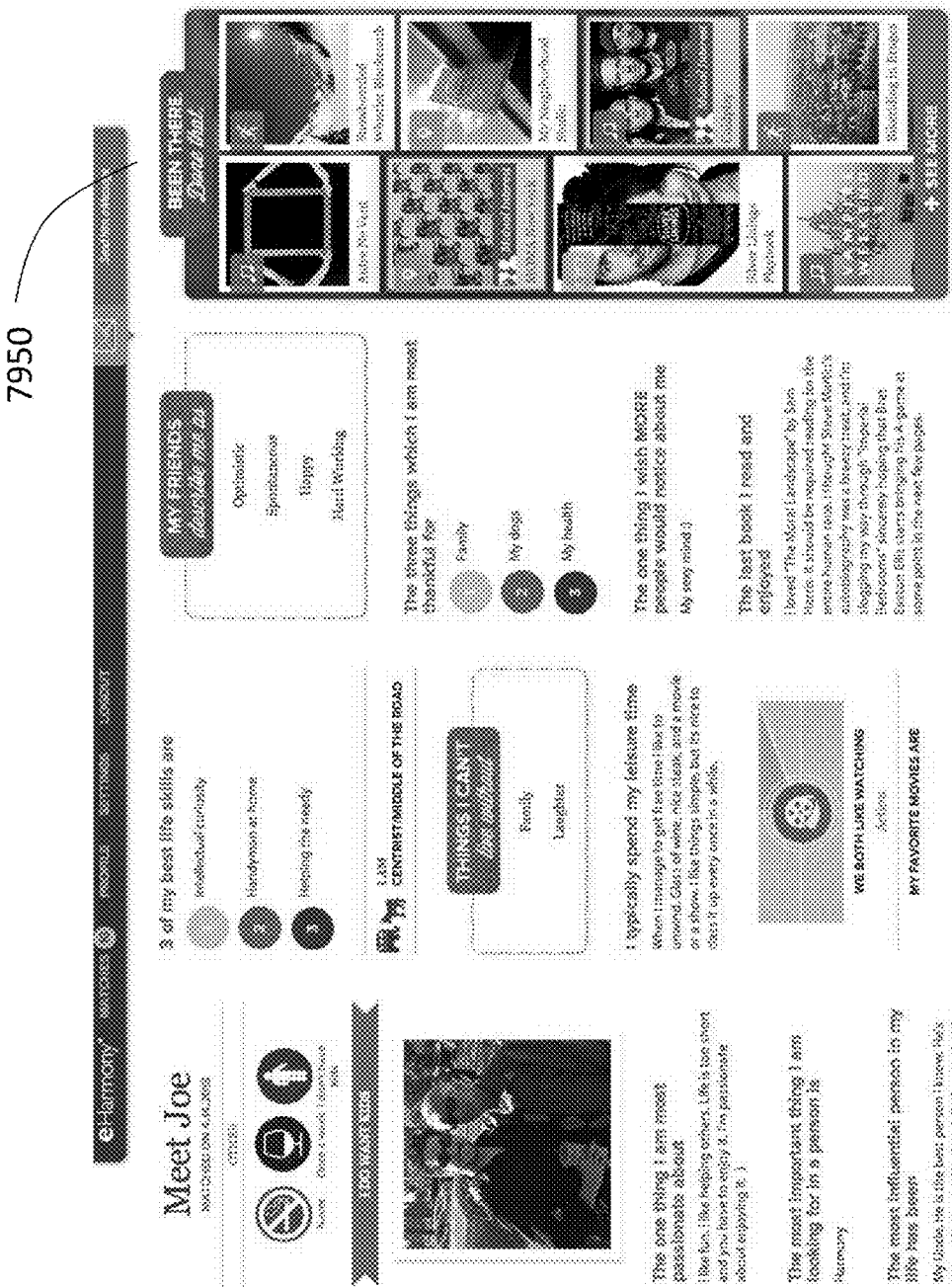

FIG. 7E shows an exemplary interface 7900 for editing an existing event. When the user selects an event 7910 (e.g., the "Done this" Snowboarding in Whistler, Calif., event as can be seen in FIG. 7D), the system 1200 displays the details of the event 7910 for the user to edit. When the user is done editing, e.g., by clicking a Done button, the system displays the user's activities and experiences in a preview mode as shown in FIG. 7F. FIG. 7G shows an exemplary user profile after the user has posted a number of experiences, e.g., in the "Been There. Done That" window 7950.

Figure 7H:
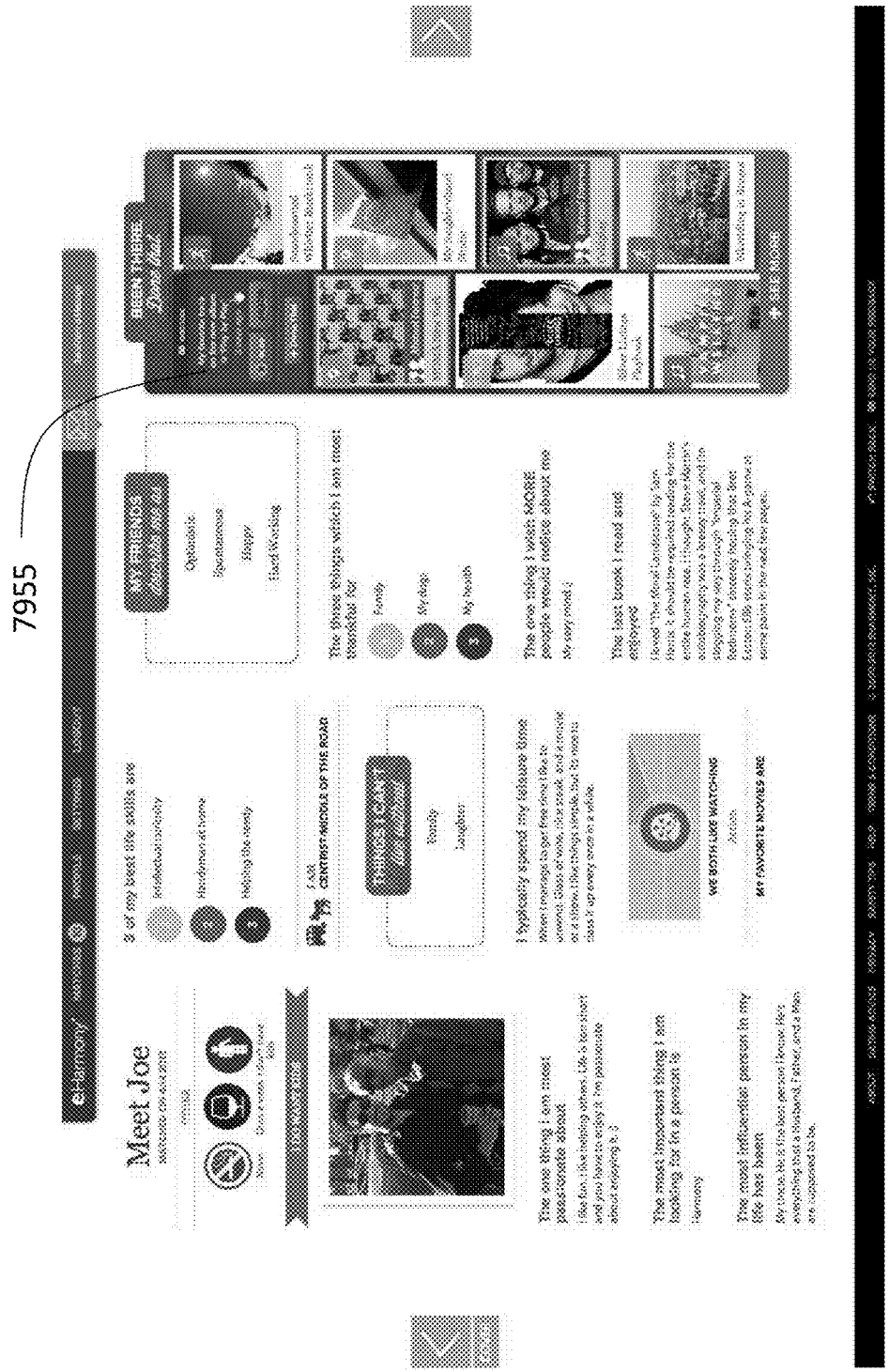

FIG. 7H shows an exemplary interface with an interactive event card. In this example, the user may click on an event to perform one or more actions. For example, when a second user is viewing the profile of the user, the second user may click on a music event 7955. The system 1200 then displays details of the event. The system 1200 also provides the ability for further actions, e.g., play the music, link to purchase the music, or respond to the event ("Done That"), and so on.

According to another embodiment, the matching system 1200 integrates the users' data from third-party system 1500, such as social networking sites Facebook, Twitter, and so on. As an example, Facebook Connect data may be utilized by the matching system 1200. Facebook Connect is a Facebook application program interface (API) that allows the system 1200 to integrate the users' Facebook data (e.g., profile, friends, photos, posts, likes, checkins, and so on) with the users' data on the system 1200. The system 1200 may integrate data from the third-party system 1500 routinely, automatically and/or dynamically. The system 1200 may also allow the users to control the automatic updates (e.g., by reviewing the imported data), or to update their profiles and data manually.

Figure 8:
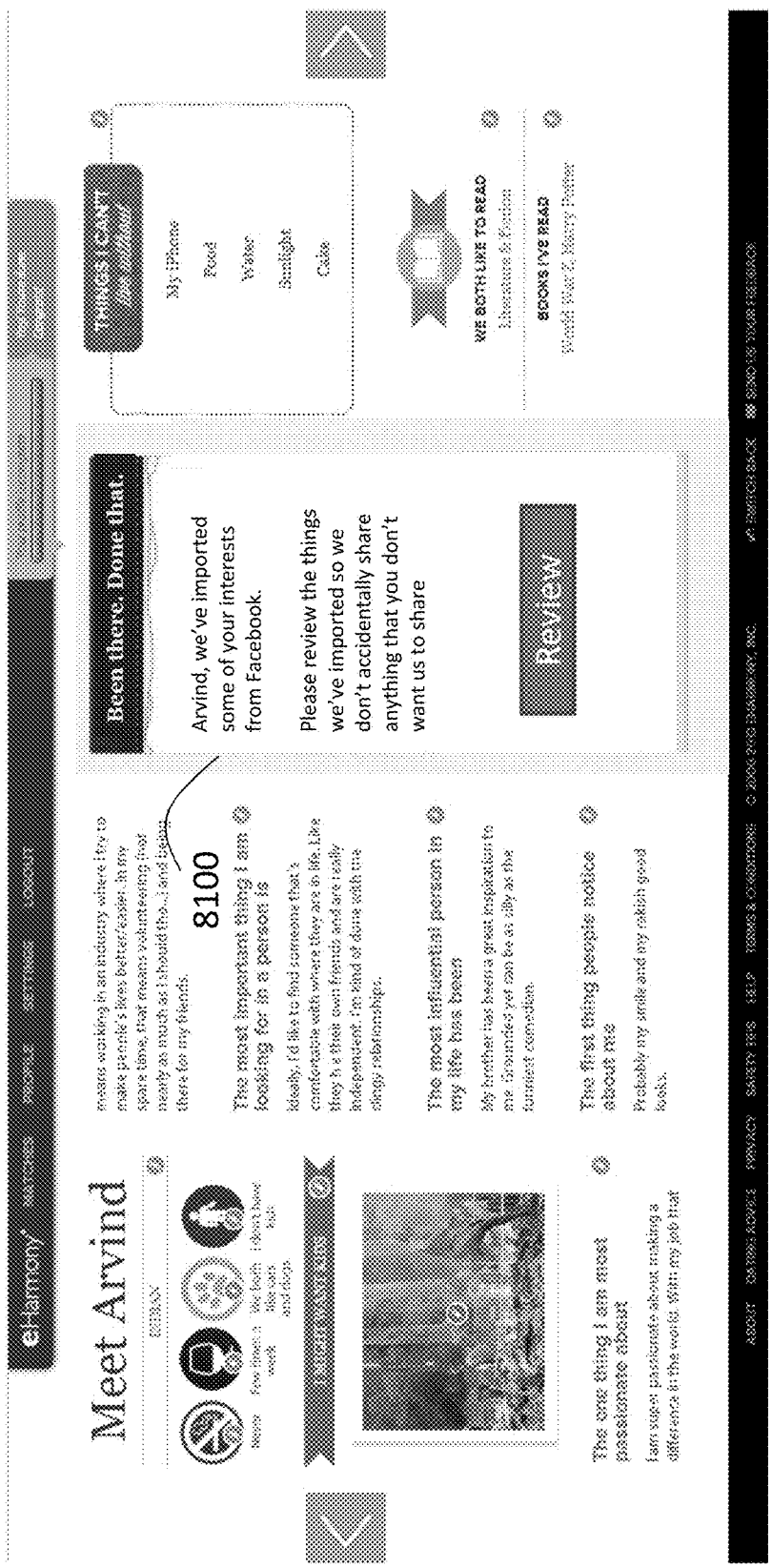
FIG. 8 is another exemplary user interface according to an embodiment of the present invention.
Figure 9:
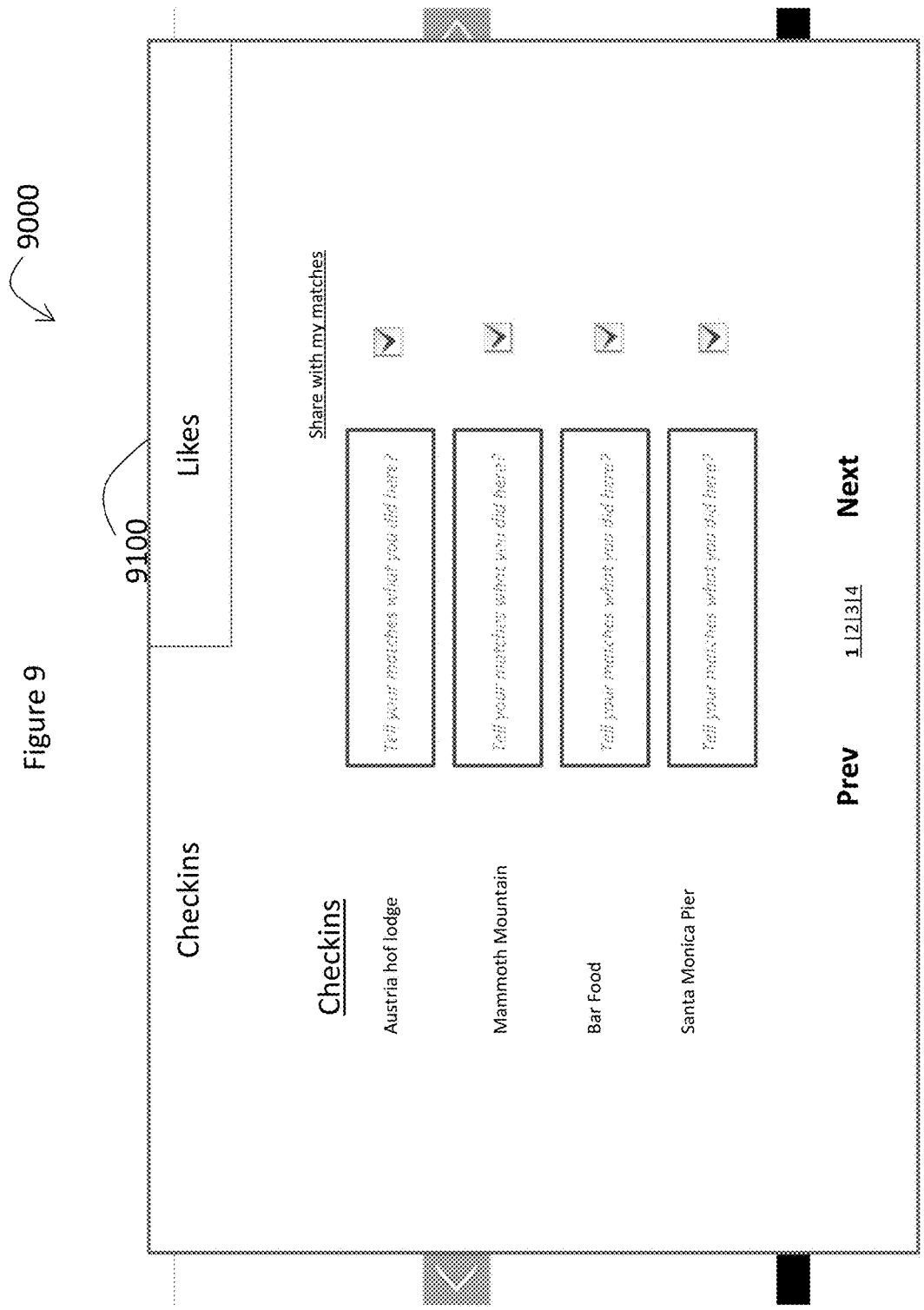
FIG. 9 is another exemplary user interface according to an embodiment of the present invention.
Figure 10:
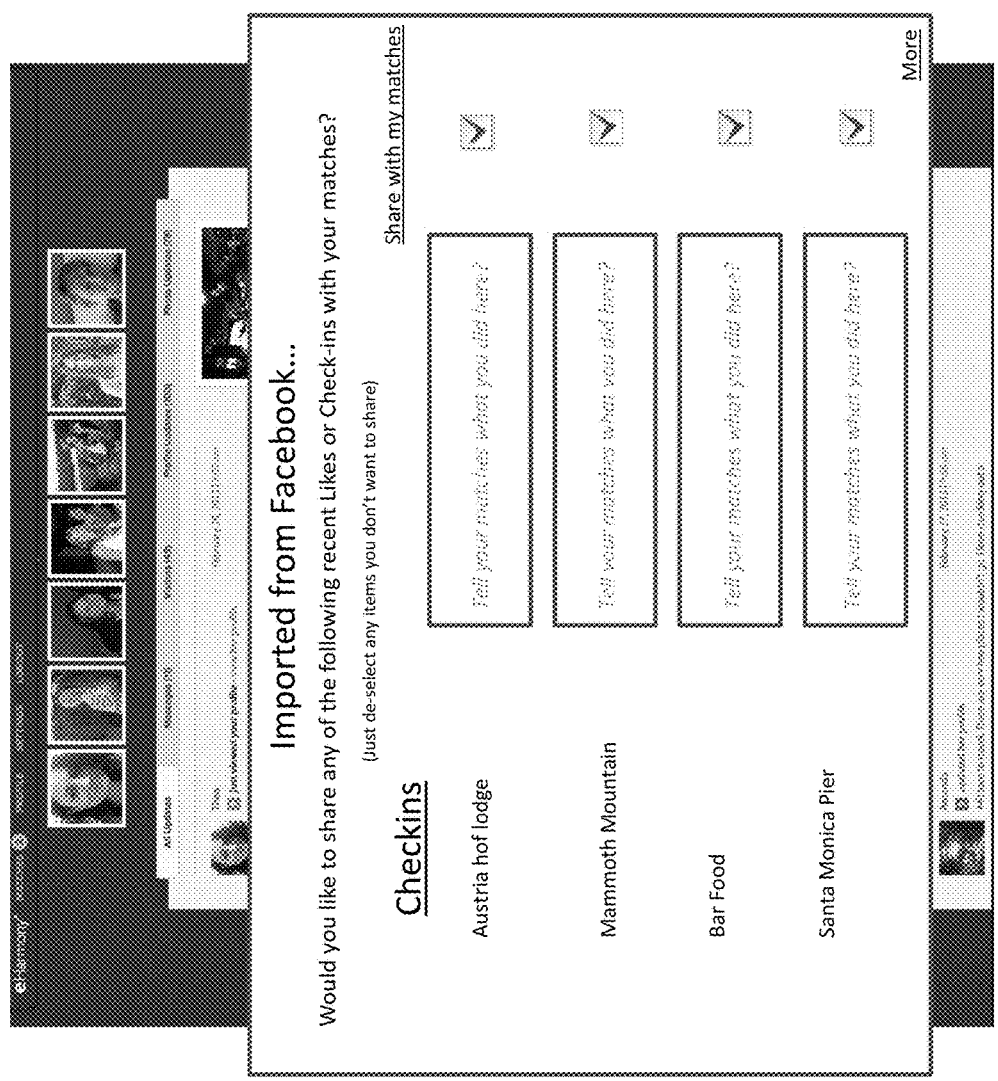
FIG. 10 is another exemplary user interface according to an embodiment of the present invention.
Figure 11:
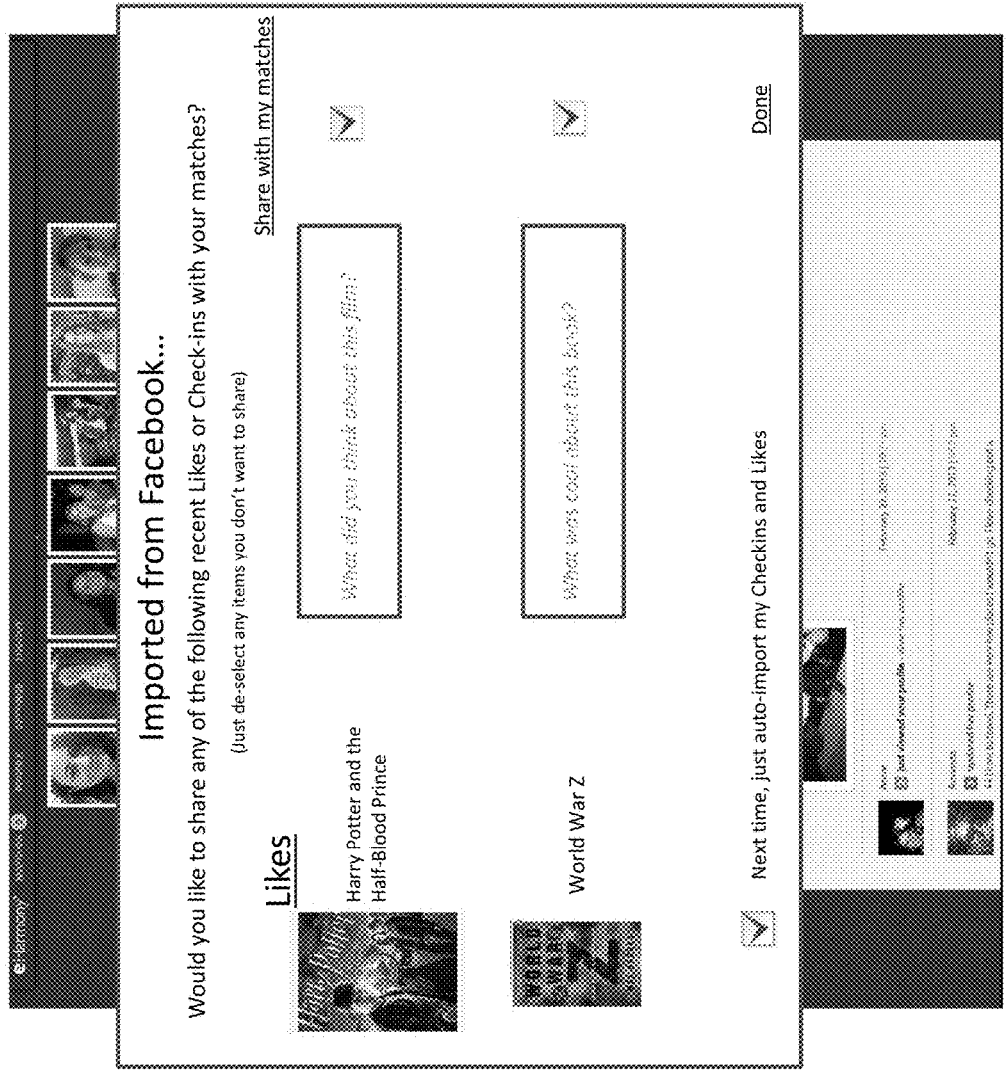
FIG. 11 is another exemplary user interface according to an embodiment of the present invention.

FIGS. 8 to 11 show exemplary interfaces for importing user's Facebook data to the system 1200. Once the system 1200 has imported user data from the user account or profile on Facebook, the system 1200 updates window 8100 as shown in FIG. 8. Window 8100 now indicates that the user's experiences or interests have been imported from Facebook and asks the user to review. FIGS. 9 to 11 show the exemplary interfaces for reviewing the data imported from Facebook. For example, FIG. 9 shows the Facebook Checkins that have been imported. The user then may select to share one or more Checkins with other users of the system 1000. The user may also provide further information for each Checkin. In this exemplary interface, the user may click on the tab 9100 to review the imported Facebook Likes. One or more tabs may be further provided for reviewing other imported data. Alternatively, one or more interfaces may be further provided for reviewing other imported data.

FIG. 10 shows another example of an interface for reviewing imported Facebook Checkins Whereas FIG. 11 shows another example of an interface for reviewing imported Facebook Likes.

Figure 12:
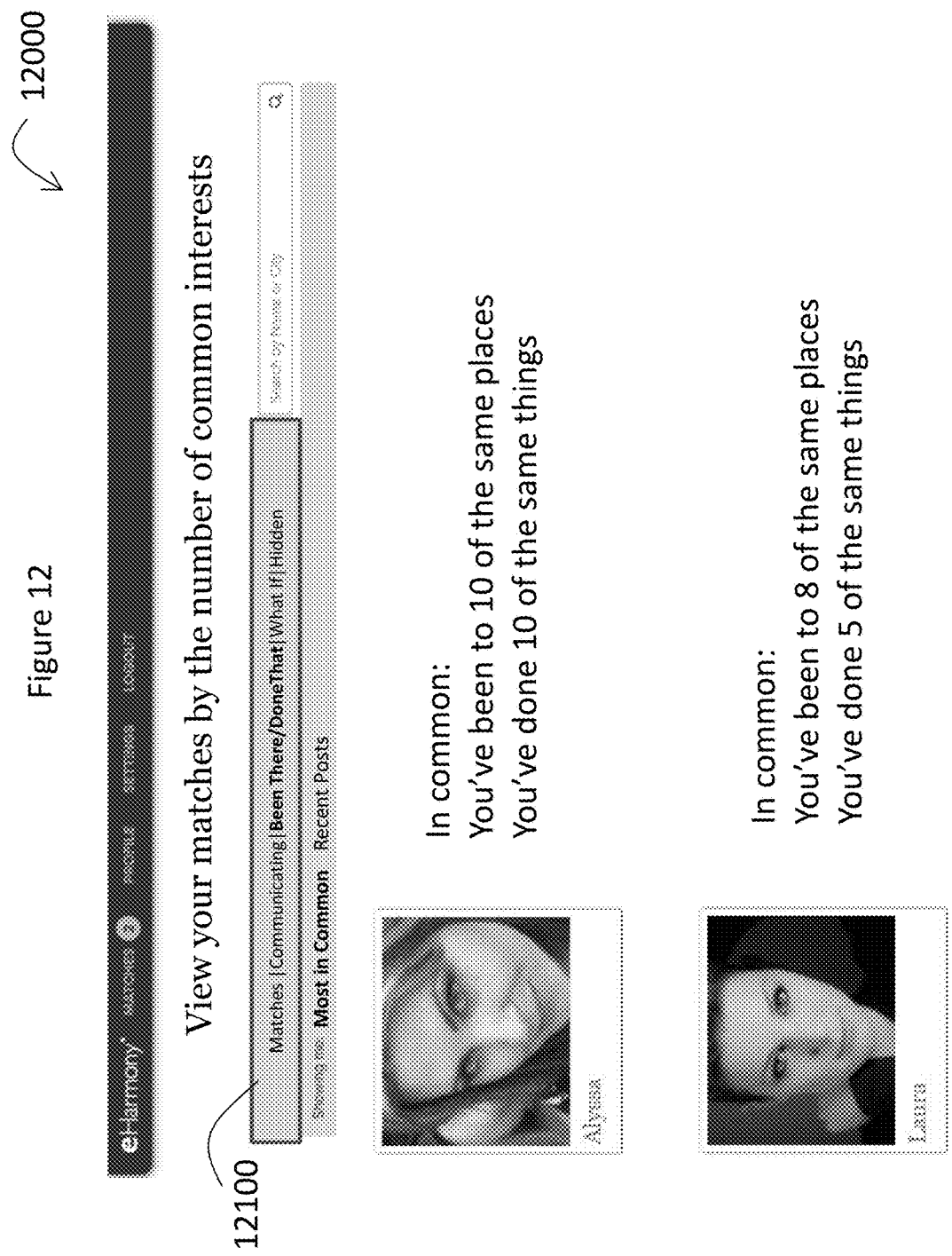
FIG. 12 is another exemplary user interface according to an embodiment of the present invention.
Figure 12A:
FIGS. 12A to 12C are other exemplary user interfaces according to an embodiment of the present invention.
Figure 12B:
Figure 12C:
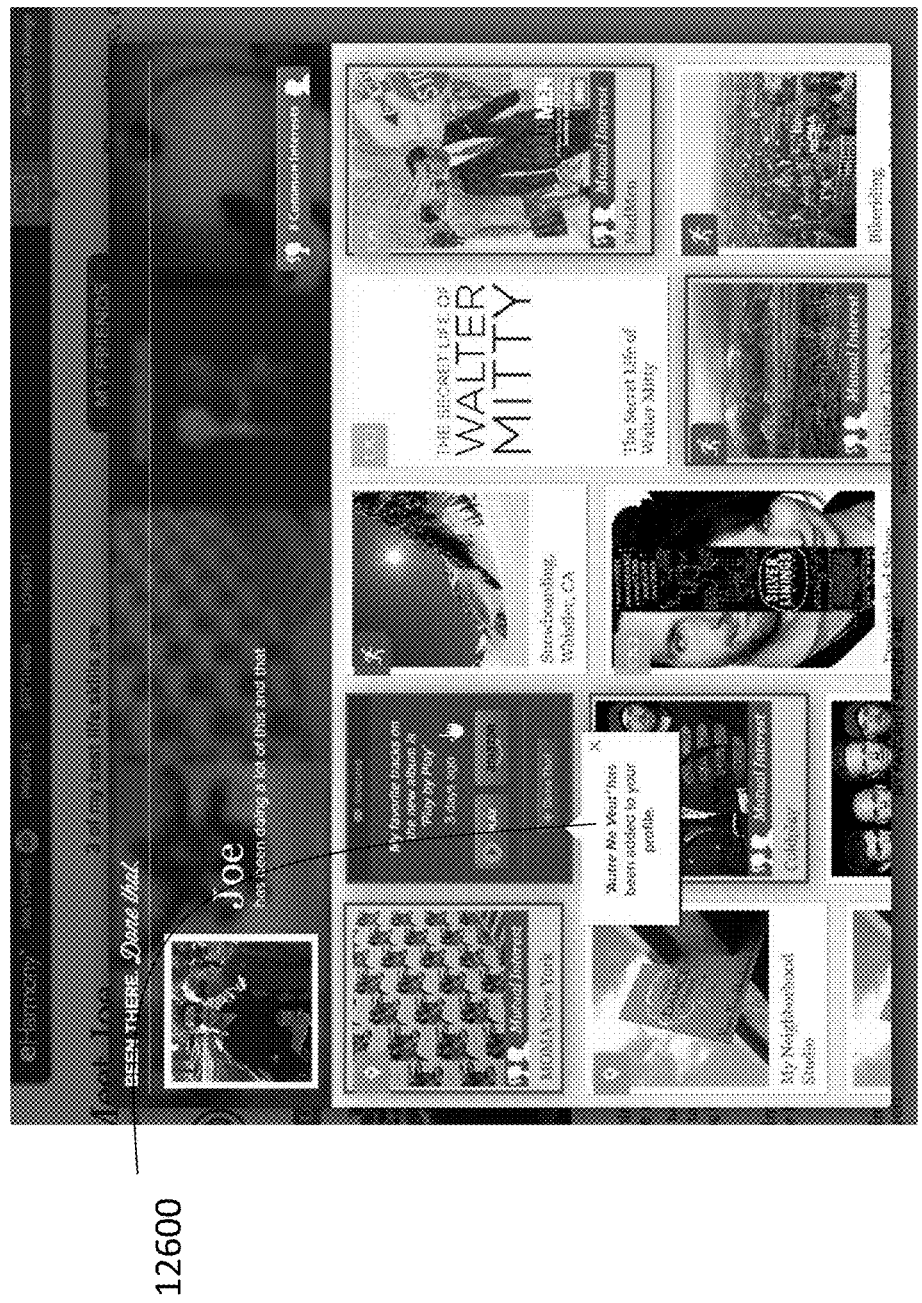
Figure 13:
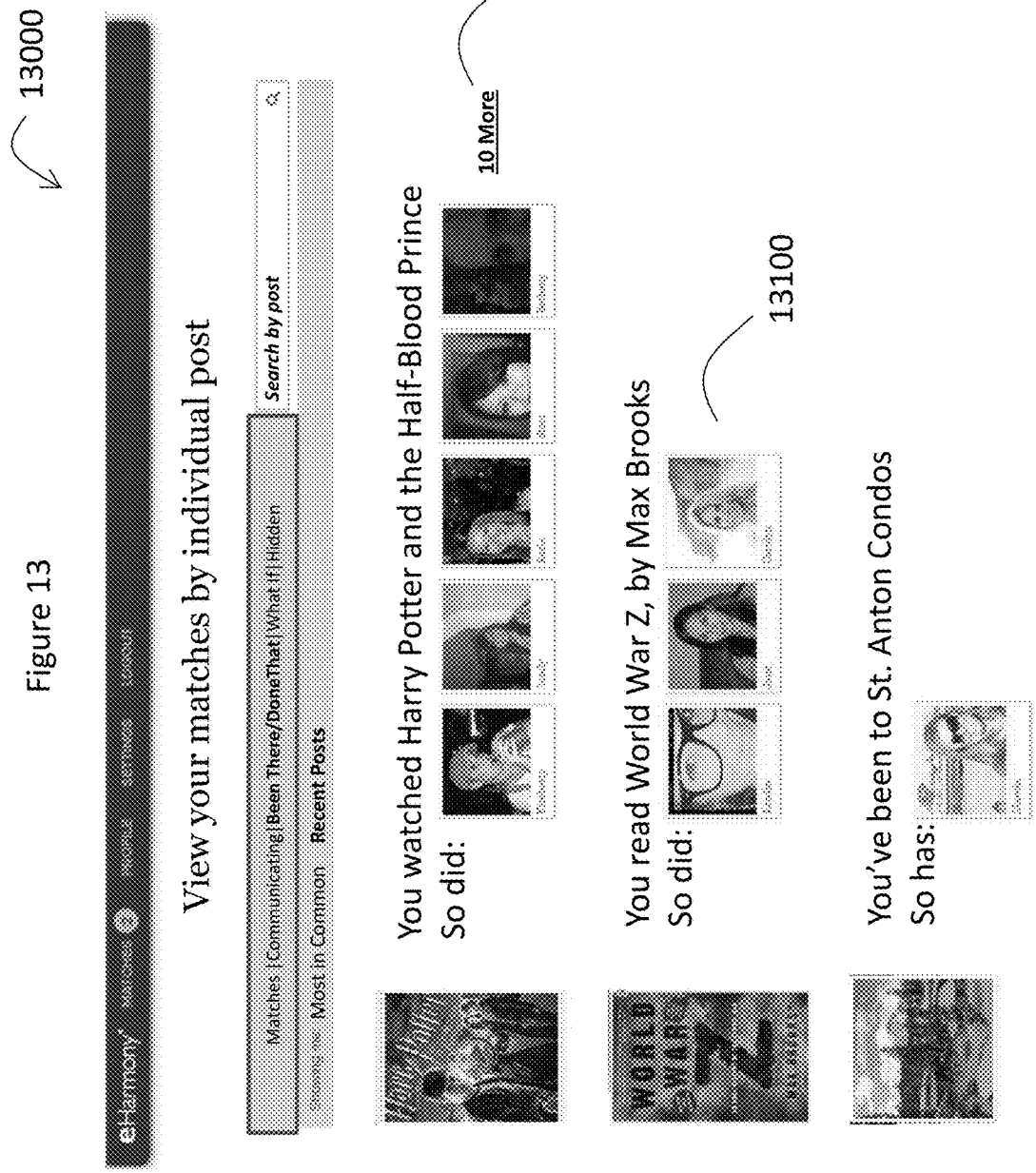
FIG. 13 is another exemplary user interface according to an embodiment of the present invention.
Figure 14:
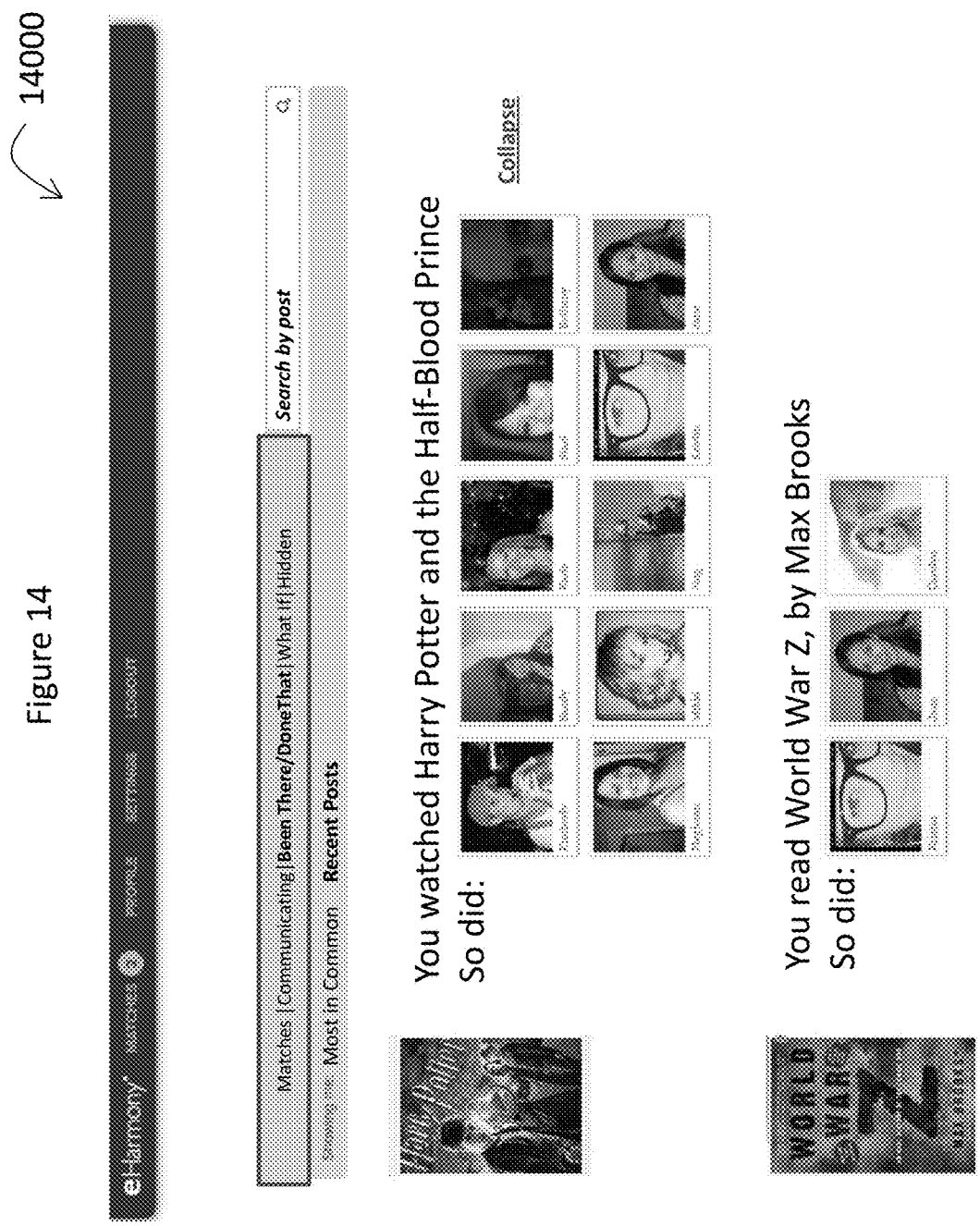
FIG. 14 is another exemplary user interface according to an embodiment of the present invention.

At any time, the user may view other users (matches) of the system 1000 that have common experiences or interests with the user. FIGS. 12 to 14 show exemplary interfaces for showing these matches. FIG. 12 shows an aggregate view interface 12000 showing matches by the number of common interests or experiences. For example, the user has been in ten common places and done ten common activities with user (match) "Alyssa." FIG. 12A shows another exemplary aggregate view interface. FIG. 12B shows an exemplary interface having an interactive event card, similar to event card in FIG. 7H. As described with FIG. 7H, a second user viewing the profile of the user may click to respond (e.g., "Done That" or "Me Too"). As a result of the response, the system 1200 also posts the event in the profile of the second user, as shown in FIG. 12C at pop-up 12600. Consequently, the compatibility value between the user and the second user increases. The compatibility values between the second user and other users who also completed the same experience and/or activity may also increase.

FIG. 13 shows an exemplary interface 13000 that shows matches by individual posts. For example, the user has posted that the user has read the book World War Z, the system 1200 finds and displays the three matches 13100 who have also read the same book. Other posts include movies, places, and so on. When there are more matches to display, the user may click on indication 13200 to view an expanded list of matches, as shown in FIG. 14.

Figure 14A:
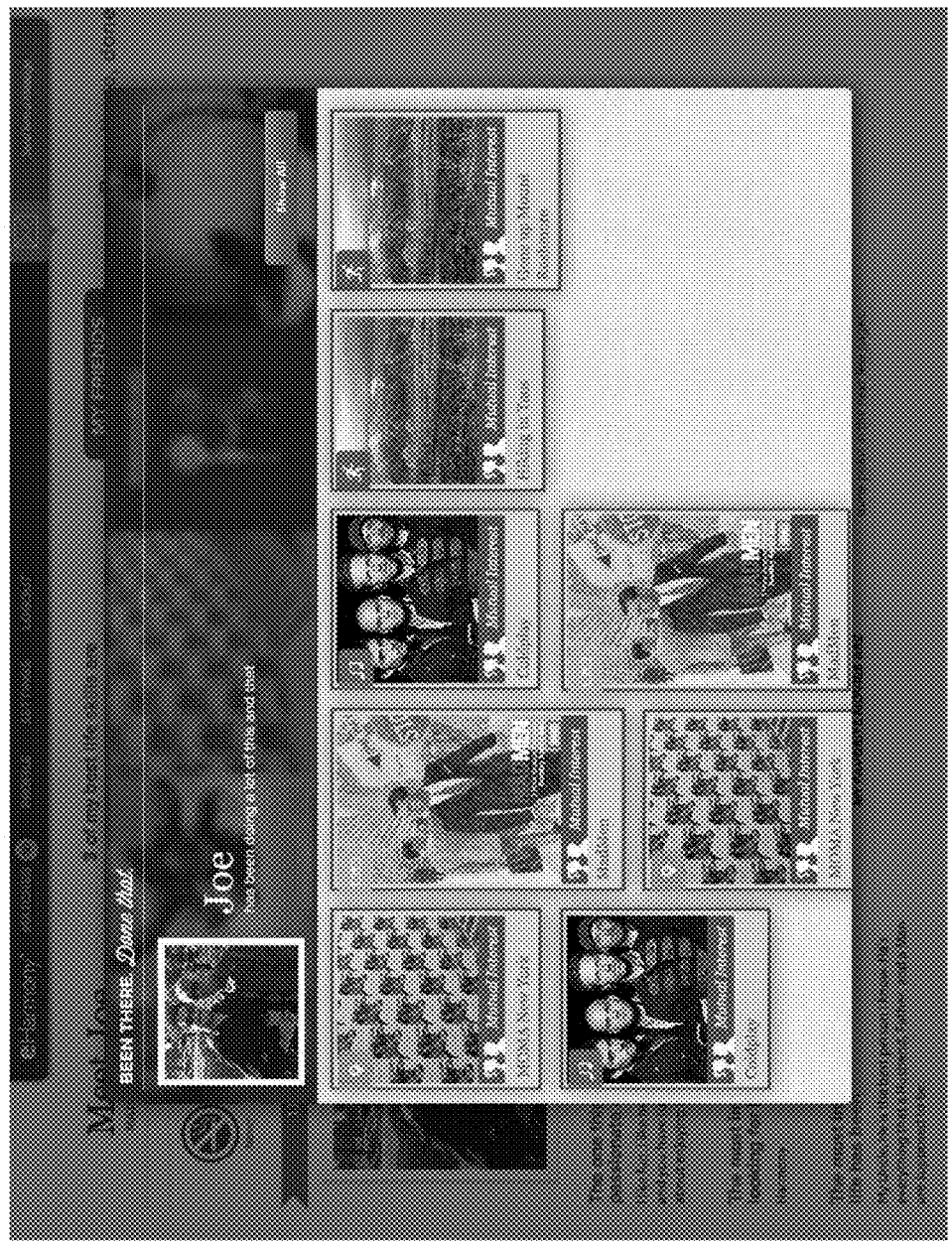

In an embodiment, not shown in the Figures, matches may also be shown by events. Matches may also be shown in a combination of two or more data as discussed with FIGS. 12 and 13, and with other data/events. The users may post photos for trips or specialized activities. Facebook import of Likes may be used to populate events. The system 1200 may display full view of all events from the user profile. FIG. 14A shows an exemplary filtering interface wherein only events having common interests with other users are displayed. FIG. 14B shows another exemplary interface wherein the system 1200 displays users who have common interests with the user.

Figure 15:
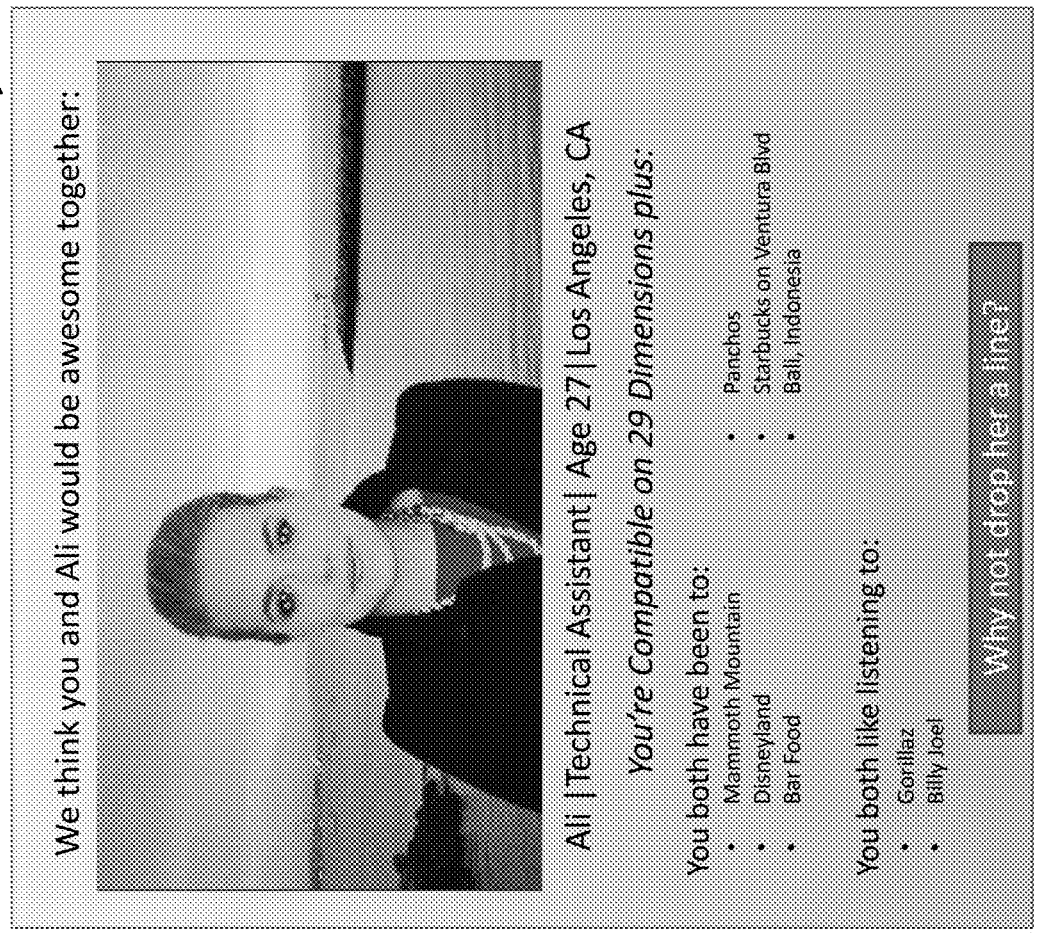
FIG. 15 is an exemplary notification according to an embodiment of the present invention.

According to an embodiment, the system 12000 may also notify the user of common matches. The system 12000 may send notifications periodically (daily, weekly, bi-weekly, etc.), or instantly when there is change in the common matches. Notifications may be sent using email, messages, and so on. FIG. 15 shows an exemplary notification 15000. The notification may include, but are not limited to, photo and information of the match and the common experiences and interests that the match has with the user. The notification may also provide a link for the user to communicate with the match.

According to another embodiment, the system 1000 calculates goals and metrics of the users' experiences shared and matched. These goals and metrics may include, but are not limited to, timely profile richness such as number of posts, number of reposts, number of social networking integration (e.g., Facebook Connect). They may also include the communication taken as results of sharing experiences, such as number of actions taken, number of profile views following a post, number of inbound communication following a post, and so on. These metrics may also be used in public relation and social or advertising campaigns.

Figure 16:
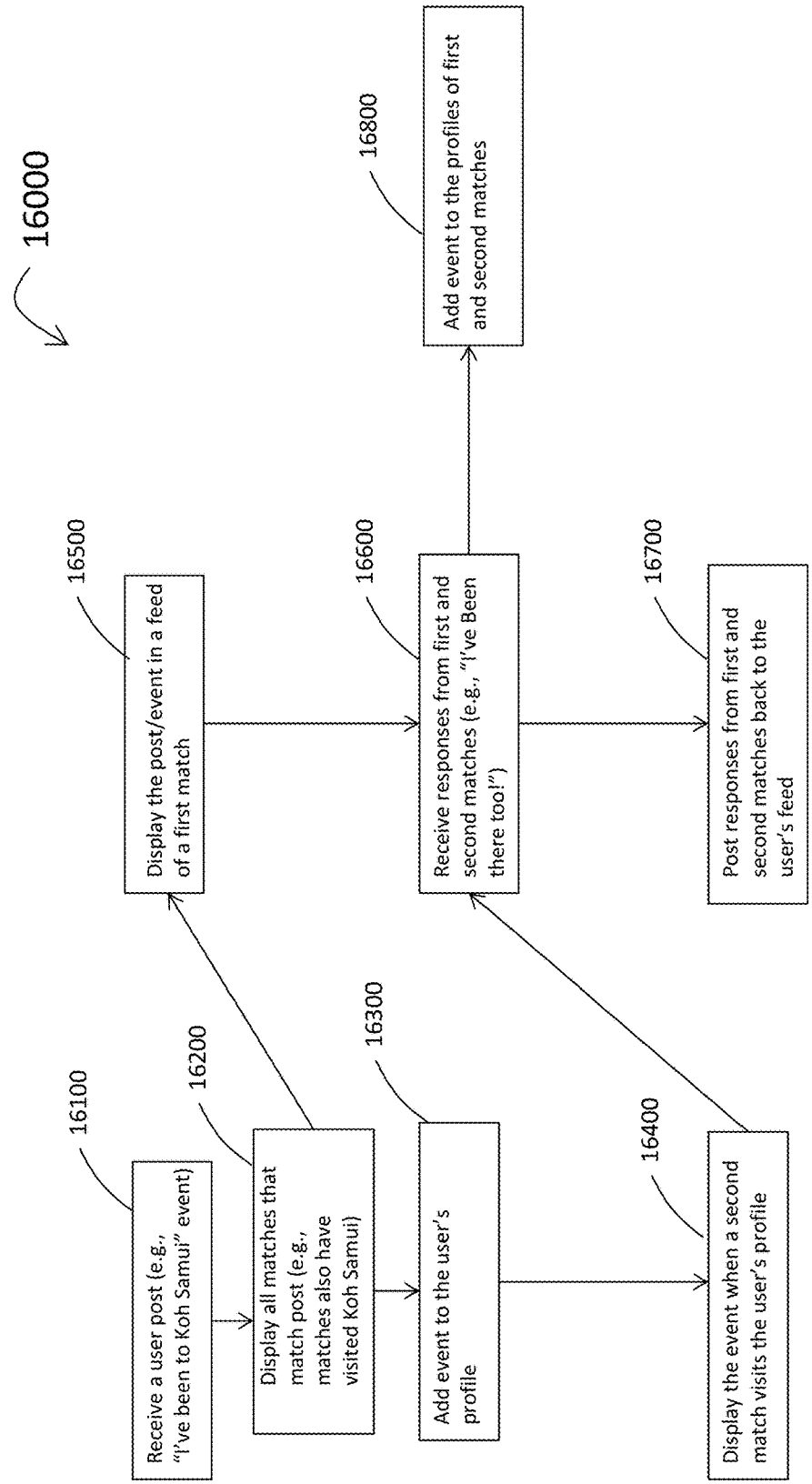
FIG. 16 is an exemplary process according to an embodiment of the present invention.

FIG. 16 shows an exemplary process of the system 1000 as described in the Figures above. In this example, when a user posts an experience (Action Block 16100), e.g., a "I've been to Koh Samui" event, the system 1200 searches, retrieves and displays (Action Block 16200) all matches that match the post/event, e.g., all matches that have also visited Koh Samui. The system 1200 also adds the event to the user's profile (Action Block 16300) and displays the post/event in the feed of one or more matches (Action Block 16500), thus also allowing the matches to view the post/event. When another user or match visits the user's profile, the system 1200 also displays the event with the user's profile (see, e.g., FIG. 3) (Action Block 16400). Matches or other users who view the post/event may respond to the post/event (see, e.g., FIGS. 3 and 4, "I've Been There Too!" or "I've Done That Too!") (Action Block 16600). The system 1200 then adds the event to the profiles of the users or matches who respond (Action Block 16800) and posts the responses back to the feed of the user (Action Block 16700). The system 1200 may encourage the user and the matches to communicate further (not shown).

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for interpersonal relationships; however, the invention can be used for any relationship in general. Additionally and obviously, features may be added or subtracted as desired. Accordingly, the invention is not to be restricted except in light of the attached claims and their equivalents.

What is claimed is:

1. A computer-based user interface system comprising a plurality of user devices each comprising a display for graphically presenting interpersonal relationship analysis and recommendation, comprising:

a matching server system including instructions stored in non-transitory computer-readable memory, the matching system operatively coupled to a network and having a non-transitory database storing user profiles for a plurality of users, wherein the matching server system includes a processor that, upon executing the instructions, is configured to:

calculate an initial compatibility value by correlating a first user match profile associated with a first user with a second user match profile associated with a second user, such correlation resulting in a potential match between the first and second users if the compatibility value exceeds a predetermined threshold, wherein the matching server system is configured to employ a neural network that dynamically optimizes correlation calculations based on learning from empirical data gathered by the system and based on previous compatibility calculations;

display a first user profile on a first graphical user interface implemented on the display of a first user device operatively coupled to the network and the matching server system, the first user profile adapted to graphically enable the first user to selectively post a user experience indicator and to respond to one or more other user experience indicators displayed in a dashboard associated with the first user profile, wherein the selective posting includes selectively importing user experience data from a third-party platform to the matching server system and selectively displaying the user experience data that can be reached directly from the first user profile for review by the first user via the first graphical user interface, without launching the third-party platform, along with an associated experience marking indicator that graphically represents an event type of the user experience data being selectively posted, before publicly displaying the user experience profile in association with the first user profile; and enable a second user device operatively coupled to the network and the matching server system to:
receive the user experience indicator posted by the first user via the network if the compatibility value between the first user and the second user exceeds the pre-determined threshold as determined by the processor of the matching server system;
display a second user profile including the received user experience indicator and the associated experience marking indicator on a second graphical user interface implemented on the display of the second user device; and
dynamically display on the second graphical user interface a response indicator that can be reached directly from the second user profile,
wherein the response indicator presents one or more editable pre-generated responses specifically associated with the type of content of the received user experience and the associated experience marking indicator.

2. The computer-based system of claim 1, wherein the user experience indicator includes at least one of places and activities.

3. The computer-based system of claim 1, wherein the second user device is further configured to enable a filter for the second user to select a category of places or activities to respond to user experience indicators posted by the first user, as displayed via the second user device graphical user interface.

4. The computer-based system of claim 3, wherein the initial compatibility value calculated from correlating the first user match profile with the second user match profile is selectively increased by the matching server system if the second user responds to the user experience indicator of the first user.

5. The computer-based system of claim 3, wherein the matching server system saves response indicators from other users to user experience indicators posted by the first user in the first user match profile.

6. The computer-based system of claim 1, wherein the matching server system is further configured to store the imported user experience data from one or more social networking systems for the plurality of users in the user profile database in association with the respective user profiles.

7. The computer-based system of claim 1,
wherein the compatibility value between the first user and the second user selectively increases if the first and second users have matching user experience indicators.

8. The computer-based system of claim 1, wherein the selectively importing user experience data from the third-party platform is done routinely, automatically, dynamically, or a combination thereof.

9. The computer-based system of claim 1, wherein the user experience data for review by the first user is selectively displayed in one or more tabs.

10. The computer-based system of claim 1, wherein the user experience data for review by the first user is selectively displayed in one or more interfaces.

* * * * *